(12) United States Patent
Huang et al.

(10) Patent No.: US 12,332,478 B2
(45) Date of Patent: Jun. 17, 2025

(54) PHOTONIC DEVICE AND METHODS OF FORMING SAME

(71) Applicant: Taiwan Semiconductor Manufacturing Company, Ltd., Hsinchu (TW)

(72) Inventors: Yuan-Sheng Huang, Taichung (TW); Wei-Kang Liu, Taichung (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 102 days.

(21) Appl. No.: 17/805,755

(22) Filed: Jun. 7, 2022

(65) Prior Publication Data

US 2023/0296834 A1   Sep. 21, 2023

Related U.S. Application Data

(60) Provisional application No. 63/321,648, filed on Mar. 18, 2022.

(51) Int. Cl.
  *G02B 6/122*  (2006.01)
  *G02B 6/12*  (2006.01)
  *G02B 6/136*  (2006.01)

(52) U.S. Cl.
  CPC ......... *G02B 6/122* (2013.01); *G02B 6/12004* (2013.01); *G02B 6/136* (2013.01);
  (Continued)

(58) Field of Classification Search
  CPC .. G02B 6/12004; G02B 6/122; G02B 6/1228; G02B 6/136; G02B 6/262; G02B 6/305;
  (Continued)

(56) References Cited

U.S. PATENT DOCUMENTS

| 5,432,877 | A | 7/1995 | Sun et al. |
| 7,680,371 | B2 | 3/2010 | Cheben et al. |

(Continued)

FOREIGN PATENT DOCUMENTS

| CN | 103119486 | A | 5/2013 |
| CN | 109983381 | B | 6/2021 |

(Continued)

OTHER PUBLICATIONS

Machine translation of Description of JP-H01142502-A. (Year: 1989).*

(Continued)

*Primary Examiner* — Daniel Petkovsek
*Assistant Examiner* — Emma R. Oxford
(74) *Attorney, Agent, or Firm* — Haynes and Boone, LLP

(57) ABSTRACT

A photonic device and related method for forming a photonic device. In some embodiments, a method of fabricating a photonic device includes forming a layer stack over a substrate. In some cases, the layer stack includes a lower cladding layer, a core layer disposed over the lower cladding layer, and an upper cladding layer disposed over the core layer. In some examples, the method further includes patterning the layer stack to form a waveguide for the photonic device. In some cases, the waveguide includes the core layer, and the core layer includes a lateral surface having a convex profile.

20 Claims, 16 Drawing Sheets

(52) U.S. Cl.
CPC ............. *G02B 2006/12102* (2013.01); *G02B 2006/12114* (2013.01)

(58) Field of Classification Search
CPC ............ G02B 6/43; G02B 2006/12102; G02B 2006/12114; G02B 1/045
See application file for complete search history.

(56) References Cited

U.S. PATENT DOCUMENTS

| | | | |
|---|---|---|---|
| 8,824,837 | B2 | 9/2014 | Ren et al. |
| 2005/0089298 | A1* | 4/2005 | Maxwell ............. G02B 6/1228 385/144 |
| 2007/0140615 | A1* | 6/2007 | Tanaka ................. G02B 6/125 385/33 |
| 2008/0044126 | A1 | 2/2008 | Costa et al. |
| 2013/0209026 | A1 | 8/2013 | Doany |
| 2014/0061677 | A1 | 3/2014 | Jakoby et al. |
| 2015/0277044 | A1* | 10/2015 | Hatori ................. G02B 6/1228 438/31 |
| 2015/0303654 | A1* | 10/2015 | Petrescu-Prahova ....................... H01S 5/2031 372/45.01 |
| 2017/0199327 | A1* | 7/2017 | Djordjevic ............ G02B 6/122 |
| 2020/0284978 | A1* | 9/2020 | Kharas ................ H01L 31/0232 |
| 2021/0088726 | A1* | 3/2021 | Chern .................. G02B 6/1225 |
| 2021/0249840 | A1* | 8/2021 | Fujiwara ................ H01S 5/106 |
| 2022/0413210 | A1* | 12/2022 | Liu ....................... G02B 6/4204 |
| 2023/0089758 | A1* | 3/2023 | Tu ...................... G02B 6/12004 385/14 |

FOREIGN PATENT DOCUMENTS

| | | | |
|---|---|---|---|
| JP | H01142502 | A * | 6/1989 |
| JP | H10111415 | A * | 4/1998 |
| JP | H10111416 | A * | 4/1998 |
| JP | 2000039531 | A | 2/2000 |
| JP | 2015191112 | A | 11/2015 |
| KR | 20110117271 | A | 10/2011 |
| TW | 201942553 | A | 11/2019 |
| TW | 202113408 | A | 4/2021 |
| WO | WO-2019187073 | A1 * | 10/2019 |

OTHER PUBLICATIONS

Machine translation of Description of JP-H10111415-A (Year: 1998).*
Machine translation of WO 2019187073 A1 (Year: 2019).*
Machine translation of JP-H10111416-A, 7 pages. (Year: 1998).*
Yi Zhang, Jianfeng Gao, Senbiao Qin, Ming Cheng, Kang Wang, Li Kai and Junqiang Sun, "Asymmetric Ge/SiGe coupled quantum well modulators", Nanophotonics, 2021; 10(6): 1765-1773.
Nan Guan, Andrey Babichev, Martin Foldyna, Dmitry Denisov, Francois H. Julien, and Maria Tchernycheva, "Optimization of the optical coupling in nanowire-based integrated photonic platforms by FDTD simulation", Beilstein Journal of Nanotechnology, 2018, 9, 2248-2254.
Worawat Traiwattanapong, Kazumi Wada, and Papichaya Chaisakul, "Analysis of Optical Integration between Si3N4 Waveguide and a Ge-Based Optical Modulator Using a Lateral Amorphous GeSi Taper at the Telecommunication Wavelength of 1.55 μm", Applied Sciences, 2019, 9, 3846; 9pgs.
Juerg Leuthold, Wolfgang Freude, Jan-Michael Brosi, Roel Baets, Pieter Dumon, Ivan Biaggio, Michelle L. Scimeca, Francois Diederich, Brian Frank, and Christian Koos, "Silicon Organic Hybrid Technology-A Platform for Practical Nonlinear Optics", Proceedings of the IEEE, vol. 97, No. 7, Jul. 2009, 1304-1316.
Yiheng Qin, Matiar M.R. Howlader and M. Jamal Deen, "Low-Temperature Bonding for Silicon-Based Micro-Optical Systems", Photonics, 2015, 2, 1164-1201.
Ramakrishnan Ganesan, Seul Ki Youn, Jei-Moon Yun, Jin-Baek Kim, "Top surface imaging study by selective chemisorptions of poly(dimethyl siloxane) on diazoketo-functionalized polymeric surface", Proc. Of SPIE, vol. 6792, 67920Z-1-67920Z-12, 13 pgs.

* cited by examiner

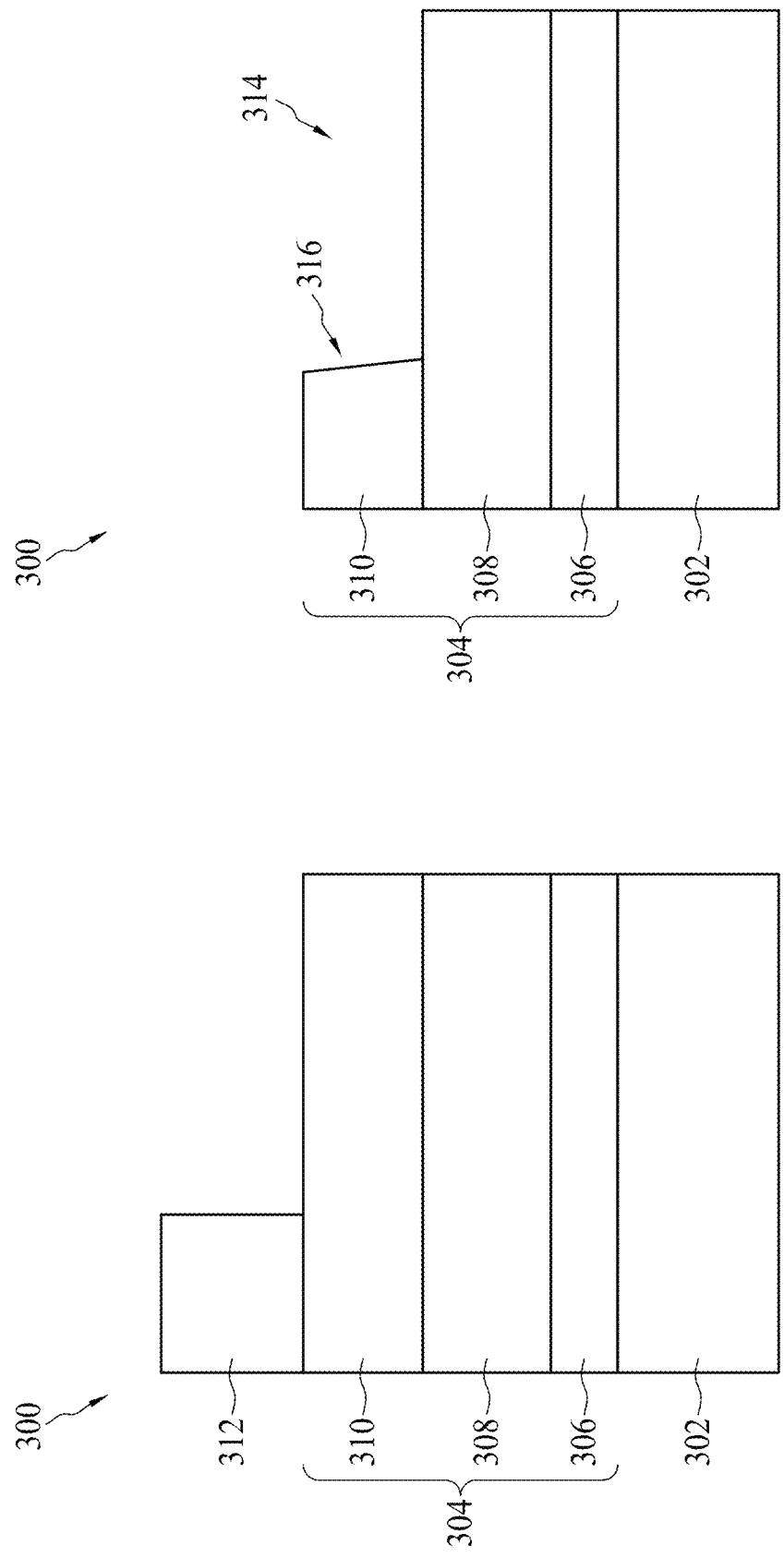

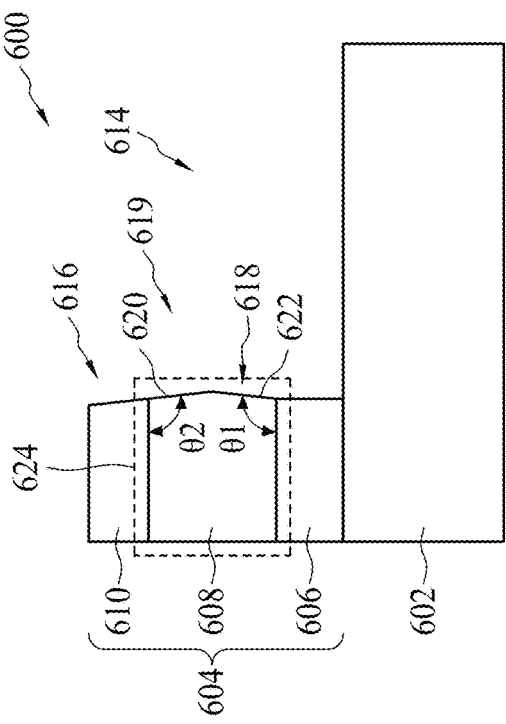
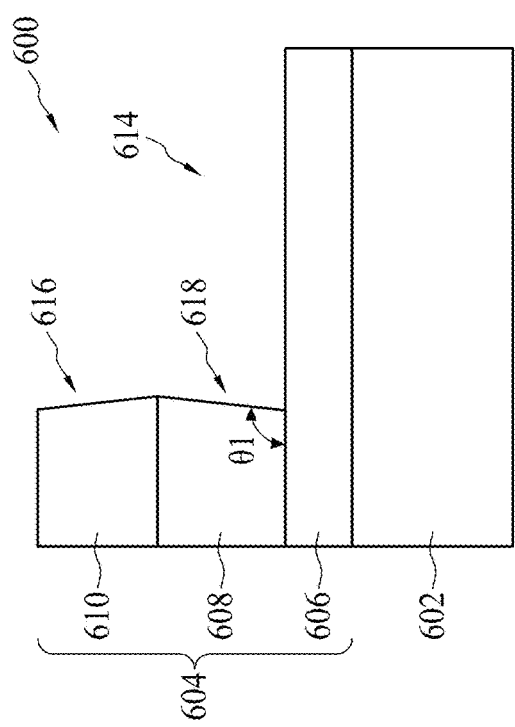
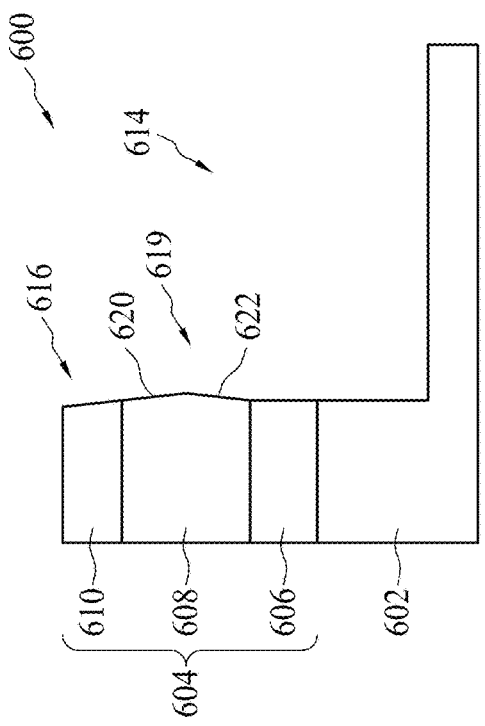

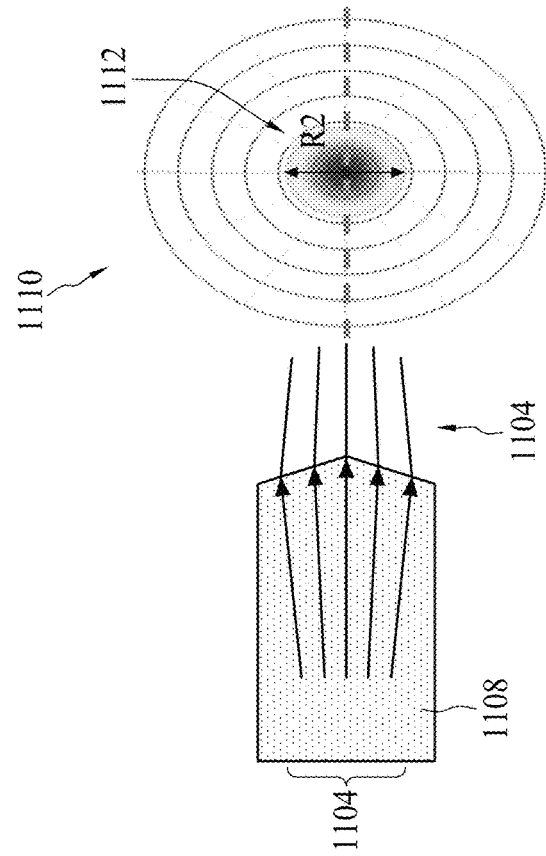
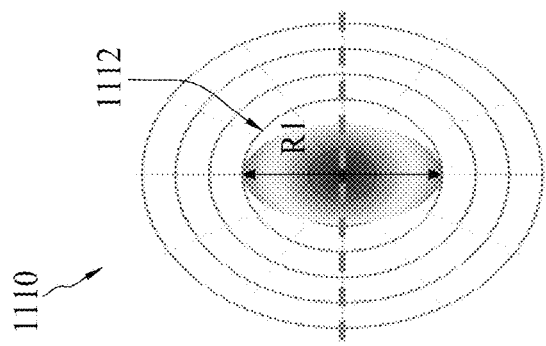
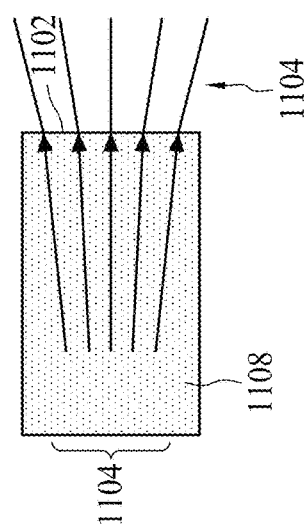
FIG. 11A  FIG. 11B  FIG. 11C  FIG. 11D

PHOTONIC DEVICE AND METHODS OF FORMING SAME

CROSS-REFERENCE TO RELATED APPLICATION

This application claims the benefit of U.S. Provisional Application No. 63/321,648, filed Mar. 18, 2022, the entirety of which is incorporated by reference herein.

BACKGROUND

Silicon-based photonic integrated circuits (PICs) provide for the integration of a plurality of optical devices and electrical devices onto a single substrate. PICs are very attractive in that they feature large bandwidths and can provide very high device speeds. Using similar semiconductor fabrication techniques to those employed in a complementary metal-oxide-semiconductor (CMOS) technology process flow, one can integrate, on a same semiconductor substrate, optical components together with electrical components to perform signal processing or other circuit functions in both optical and electrical domains. In an example, PIC optical components (e.g., such as lasers, photodetectors, phase modulators, mixers, and/or other type of optical component) may be coupled using a waveguide, such as a silicon waveguide, which may be composed of a silicon waveguide layer (e.g., Si core) disposed between top and bottom cladding layers that serve to substantially confine light within the Si core. Efficient and low-loss propagation of light through waveguides greatly affects the reliability and performance of PICs. However, in some cases, the Si core may have an undesirable tapered profile (e.g., along an optical coupling facet) that acts as a prism for light passing therethrough, causing an output field of the waveguide to shift off-target, resulting in optical loss or waveguide malfunction due to the output field shift.

Thus, existing techniques have not proved entirely satisfactory in all respects.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 3A, 3B, 3C, 3D, and 3E provide cross-sectional views of an embodiment of the photonic device along a plane substantially parallel to a plane defined by section AA' of FIG. 1, at different stages of processing according to the method of FIG. 2, in accordance with some embodiments;

FIGS. 6A, 6B, 6C, 6D, and 6E provide cross-sectional views of an embodiment of the photonic device along a plane substantially parallel to a plane defined by section AA' of FIG. 1, at different stages of processing according to the method of FIG. 5, in accordance with some embodiments;

FIGS. 11A, 11B, 11C, and 11D provide an illustrative example of using embodiments of the present disclosure to control output field diameter, in accordance with some embodiments;

DETAILED DESCRIPTION

Figure 1A:
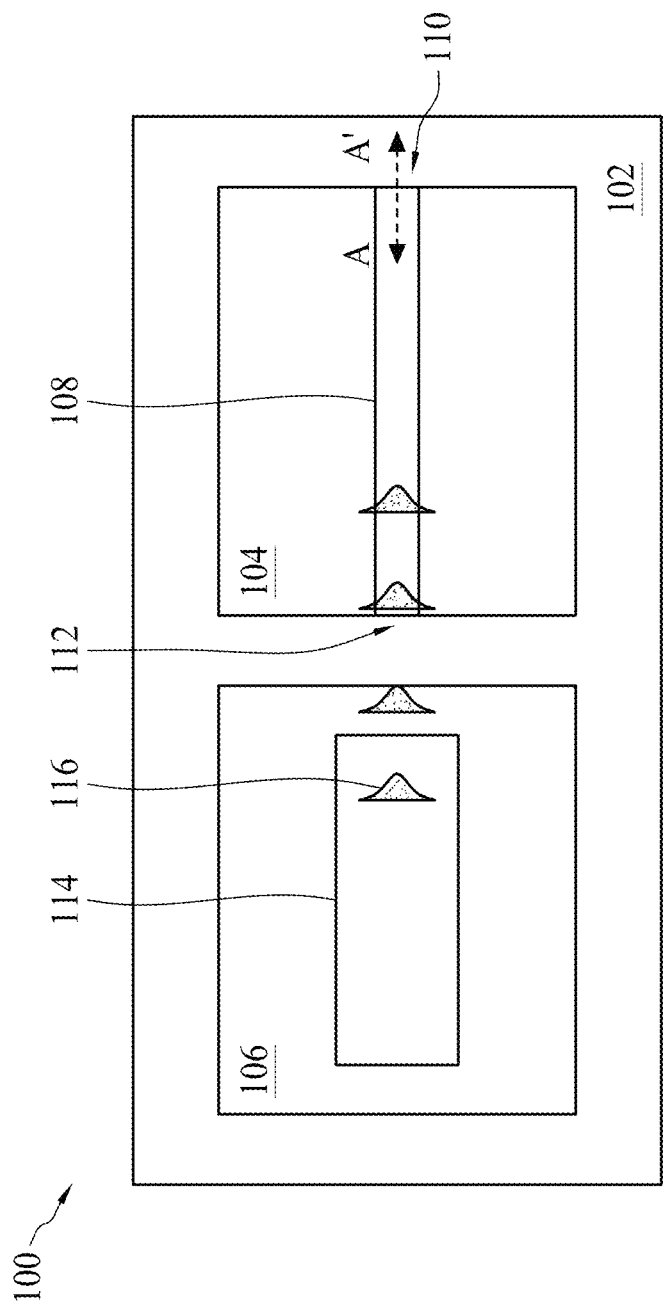
FIGS. 1A and 1B provide simplified top-down views of a photonic device, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Additionally, in the discussion that follows, dimensions (e.g., such as thickness, width, length, etc.) for a given layer or other feature may at times be described using terms such as "substantially equal", "equal", or "about", where such terms are understood to mean within +/−10% of the recited value or between compared values. For instance, if dimension A is described as being "substantially equal" to dimension B, it will be understood that dimension A is within +/−10% of dimension B. As another example, if a layer is described as having a thickness of about 100 nm, it will be understood that the thickness of the layer may in a range between 90-110 nm.

Photonic integrated circuits (PICs), such as silicon-based PICs, can be used to integrate a plurality of optical devices and electrical devices onto a single substrate. PICs are very attractive in that they provide large bandwidths and thus very high device speeds. Using similar semiconductor fabrication techniques to those employed in a complementary metal-oxide-semiconductor (CMOS) technology process flow, one can integrate, on a same semiconductor substrate, optical components together with electrical components to perform signal processing or other circuit functions in both optical and electrical domains. In an example, PIC optical components (e.g., such as lasers, photodetectors, phase modulators, mixers, and/or other type of optical component) may be coupled using one or more waveguides, such as a silicon waveguide, which may be composed of a silicon waveguide layer (e.g., Si core) disposed between top and bottom cladding layers (e.g., such as oxide layers). The top and bottom cladding layers, which have a lower index of refraction than the Si core, serve to substantially confine light within the Si core. In an example, the silicon waveguide may form a ridge structure, including the Si core and cladding layers, that serves to guide light along a particular direction.

In some embodiments, formation of a silicon waveguide ridge structure may include formation of a patterned hard mask (e.g., SiN) or a patterned photoresist layer, that forms the waveguide ridge, over a layer stack including a top oxide cladding, a silicon waveguide layer, a bottom oxide cladding, and a Si substrate. An etching process (e.g., such as a dry etching process) through the patterned hard mask or the patterned photoresist, and through the layer stack, is then performed to form the silicon waveguide ridge. The etching process used to form the waveguide ridge may include a deep (e.g., up to a few microns) and iterative etching process, where consecutive etching of each layer of the layer stack is performed. Efficient and low-loss propagation of light through waveguides greatly affects the reliability and performance of PICs. However, in at least some existing embodiments and after the etching process to form the silicon waveguide ridge, the silicon waveguide layer (e.g., the Si core) may have an undesirable tapered profile (e.g., along an optical coupling facet). In some cases, this tapered profile may be the result of photoresist shrinkage and/or lateral etching of the top oxide cladding during etching of the bottom oxide cladding. Regardless of how it is formed, the tapered profile of the silicon waveguide may act as a prism (e.g., for light passing therethrough), causing an output field of the silicon waveguide to shift off-target (e.g., in a vertical direction), resulting in optical loss or waveguide malfunction due to the output field shift. Thus, existing techniques have not proved entirely satisfactory in all respects.

Embodiments of the present disclosure offer advantages over the existing art, though it is understood that other embodiments may offer different advantages, not all advantages are necessarily discussed herein, and no particular advantage is required for all embodiments. For example, embodiments discussed herein include a photonic device and a method of forming the photonic device. In particular, some embodiments of the present disclosure provide a method of forming a silicon waveguide having a core with a convex profile to mitigate optical loss by output field shift. More particularly, various embodiments of the present disclosure provide a silicon waveguide having a silicon core with a convex (e.g., taper or dome) profile. To be sure, the various embodiments disclosed herein are not limited to silicon and may also apply to other core materials (e.g., SiN, polymers, III-V materials, or others). In some embodiments, the convex profile includes a convex prism or a convex ridge profile having top and bottom surfaces of the waveguide core layer with slanting (e.g., tapered), but oppositely oriented, surfaces. In an example, the convex prism or convex ridge profile may be formed using a high-pressure etch of the bottom oxide cladding. Alternatively, in some embodiments, the convex prism or convex ridge profile may be formed using a two-step process including (i) formation of a re-entrant surface profile of the silicon core layer and (ii) tapering a top portion of the silicon core layer by way of a bottom oxide cladding etching process. In some embodiments, the convex profile instead includes a convex lens or dome profile having a substantially smooth, rounded surface. In some embodiments, the convex lens or dome profile may be formed by first forming the convex prism or convex ridge profile by using the high-pressure etch of the bottom oxide cladding or by using the two-step process including (i) formation of the re-entrant surface profile and (ii) tapering the top portion of the silicon core layer. After forming the convex prism or convex ridge profile, a ridge trimming process is performed to round or smooth out the surface of the convex prism or convex ridge profile, thereby providing the convex lens or dome profile. Generally, embodiments of the present disclosure serve to improve (reduce) waveguide optical loss or malfunction that may be due to an output field shift. In addition, various embodiments provide for enhanced output intensity by matching an output field diameter with a detector. Further, the present embodiments are cost-effective in that undesirable tapered profiles can be mitigated and/or avoided without additional cost. Other embodiments and advantages will be evident to those skilled in the art upon reading the present disclosure.

Figure 1B:
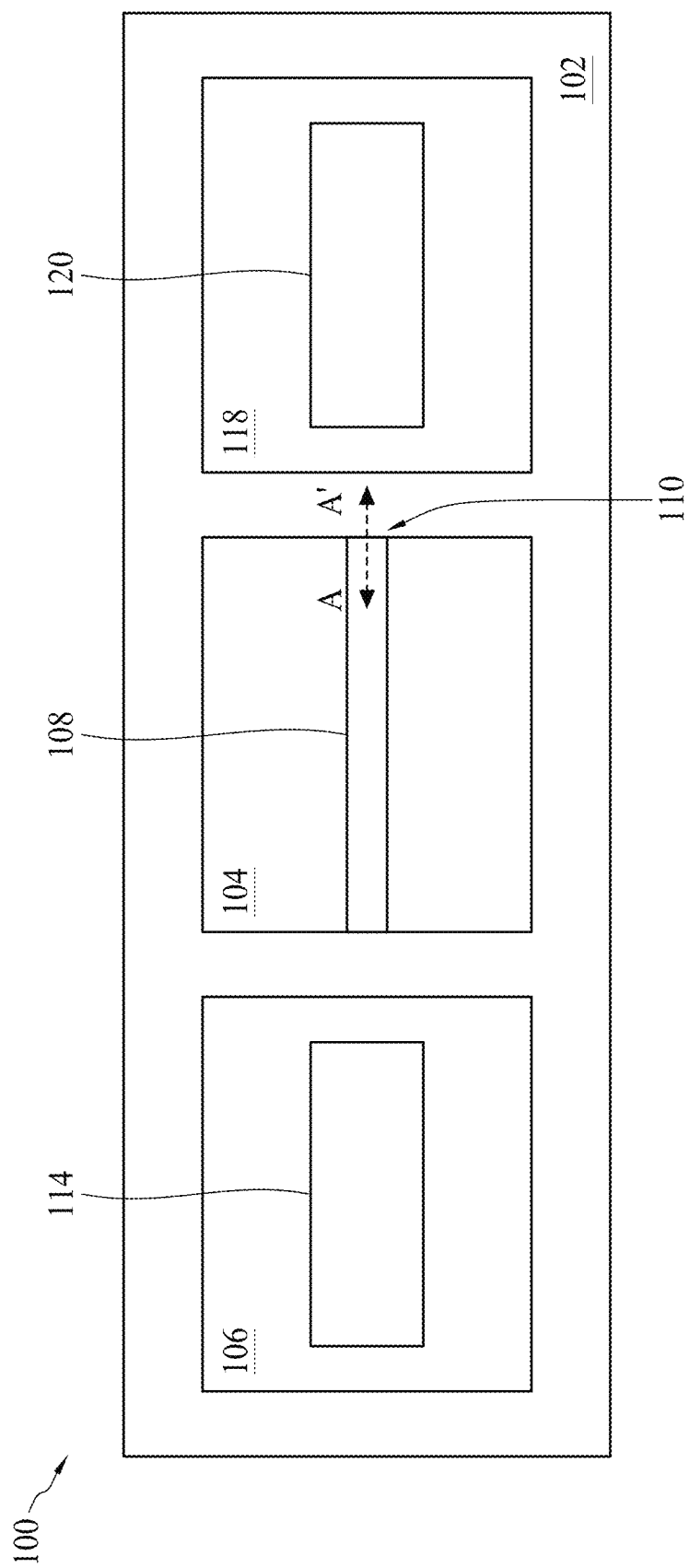

For purposes of the discussion that follows, FIGS. 1A and 1B provide simplified top-down views of a photonic device 100. In some embodiments, the photonic device 100 may include a PIC device that may comprise a plurality of optical devices and electrical devices monolithically integrated on a substrate 102 (e.g., on-chip). The photonic device 100, including the various embodiments shown and described herein, may be applicable to a wide variety of applications such as data communications (e.g., transceivers), biomedical applications (e.g., health monitoring lab-on-a-chip devices), defense and aerospace applications, astronomy, and others. In some cases, the photonic device 100 may include one or more optical components (e.g., such as lasers, photodetectors, phase modulators, mixers, resonator sensors, couplers, isolators, photodiodes, and/or other type of optical component) that are coupled using one or more waveguides. The one or more optical components of the photonic device 100 may also, in some embodiments, be coupled to one or more off-chip optical components, or more generally may be coupled to an external optical field either guided or not, via appropriately configured waveguides. In some cases, the photonic device 100 may be formed over and coupled (e.g., by way of one or more vias) to underlying CMOS circuits and/or devices, for example, as part of a 3D hybrid integrated photonics/CMOS device.

As shown in the example of FIG. 1A, the photonic device 100 may include a first region 104 and a second region 106. The first region 104 includes at least one optical waveguide 108 having the disclosed convex profile at an output facet 110 of the optical waveguide 108. In some cases, the optical waveguide 108 may alternatively, or additionally, include the disclosed convex profile at an input facet 112 of the optical waveguide 108. However, for purposes of this disclosure, it will be assumed that the convex profile is formed at the output facet 110 and not the input facet 112. Further, it will be understood that while not explicitly shown, one or more other optical components (e.g., phase modulators, filters, etc.) may be included at various locations along the length of the optical waveguide 108. In some embodiments, the second region 106 may include an optical component 114 such as a laser, light-emitting diode (LED), or other appropriate light source, that provides light 116 (e.g., a laser mode) that is coupled to the optical waveguide 108 via the input facet 112. While shown as being on-chip, in at least some embodiments, the optical component 114 and associated light source may be off-chip (e.g., a laser formed on a separate substrate, a light source coupled through an off-chip optical fiber, or other off-chip light source).

With reference to the example of FIG. 1B, the photonic device 100 may further include a third region 118. In some embodiments, the third region 118 may include an optical component 120 such as a detector, an imaging array, or other appropriate optical component that is coupled to the optical waveguide 108 via the output facet 110 (e.g., having the convex profile), thereby receiving light output from the optical waveguide 108. While shown as being on-chip, in at least some embodiments, the optical component 120 may be off-chip (e.g., an off-chip detector, optical fiber, or other off-chip optical component). In some embodiments, the optical components 114 and 120 of the second region 106 and the third region 118, respectively, may be referred to as ex-situ devices or ex-situ optical components. In some examples, the first region 104, the second region 106, and the third region 118 can be of the same or different material systems. For example, the second region 106 and the third region 118 may include any material system suitable for fabrication of optoelectronic devices, including but not limited to Si, Ge, SiGe, III-V alloys and II-IV alloys. In some embodiments, the first region 104 may include any material system suitable for the fabrication of optical waveguides, such as Si/SiO$_2$ (e.g., Si core waveguides). Various other features of the photonic device 100, and particularly the optical waveguide 108, are discussed in more detail below with reference to the methods of FIGS. 2, 5, and 7.

Figure 2:
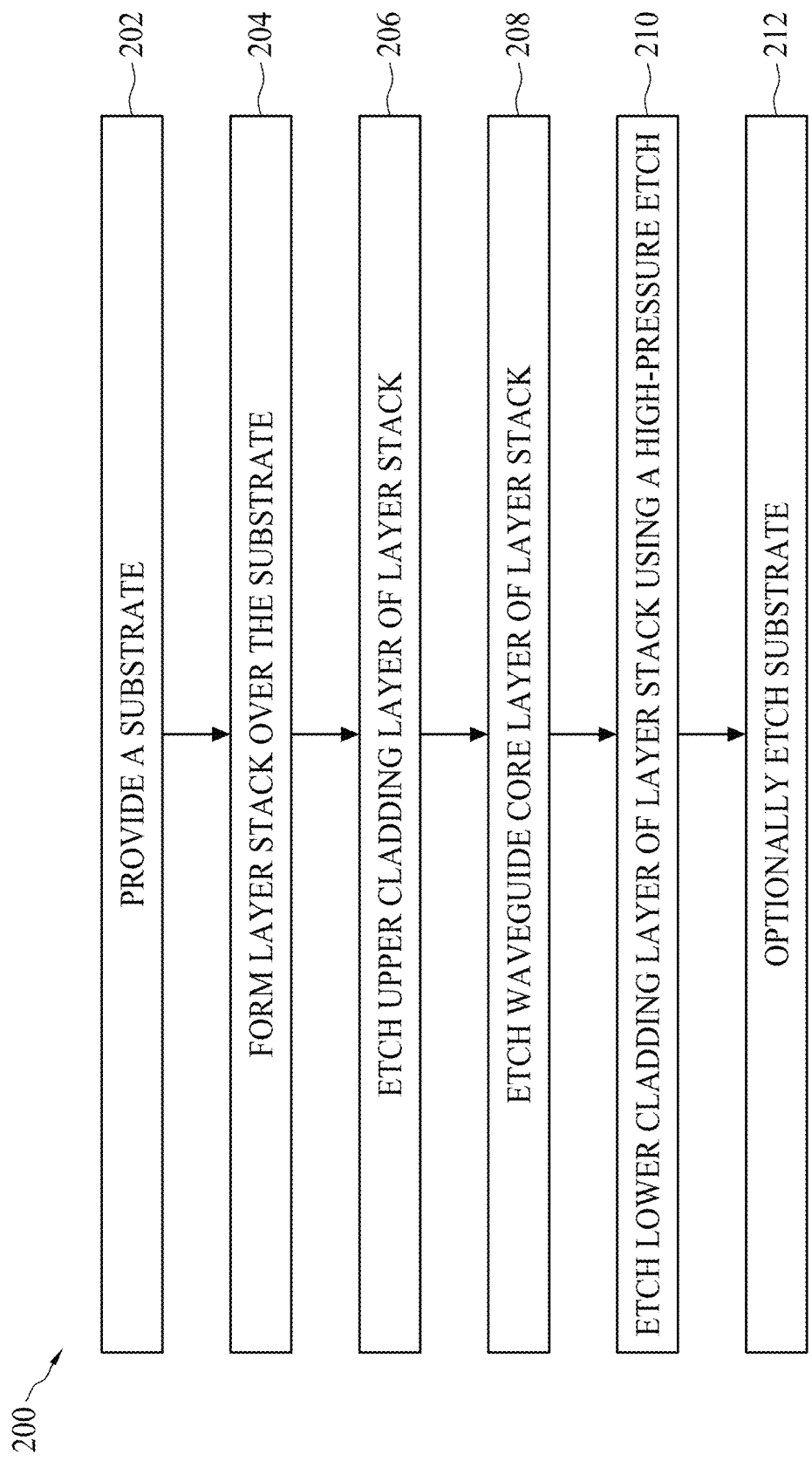
FIG. 2 is a flow chart of a method of fabrication of a photonic device having a waveguide core with a convex profile, in accordance with some embodiments.

Referring to FIG. 2, illustrated therein is a method 200 of semiconductor fabrication including fabrication of a photonic device 300 having a waveguide core with a convex profile, in accordance with various embodiments. The method 200 is discussed below generally with reference to fabrication of a ridge waveguide structure. However, it will be understood that aspects of the method 200 may be equally applied to other types of waveguide structures, such as rib waveguide structures, buried waveguide structures, slot waveguide structures, or other type of waveguide structure, without departing from the scope of the present disclosure. In some embodiments, the method 200 may be used to fabricate at least a portion of the photonic device 100, described above with reference to FIG. 1. Thus, one or more aspects discussed above with reference to the photonic device 100 may also apply to the method 200. More particularly, the method 200 is discussed below with reference to FIGS. 3A-3E, which provide cross-sectional views of an embodiment of the photonic device 300 along a plane substantially parallel to a plane defined by section AA' of FIG. 1 (e.g., at the output facet 110 of the optical waveguide 108). It is understood that the method 200 includes steps having features of a complementary metal-oxide-semiconductor (CMOS) technology process flow and thus, are only described briefly herein. Also, additional steps may be performed before, after, and/or during the method 200.

It is further noted that, in some embodiments, the photonic device 300 may include various other devices and features, such as other types of optical components (e.g., lasers, photodetectors, phase modulators, mixers, filters, and/or other type of optical component) that are coupled using one or more waveguides, as well as various electrical components including CMOS circuits and devices such as transistors, bipolar junction transistors, resistors, capacitors, inductors, diodes, fuses, logic circuits, etc., but is simplified for a better understanding of the inventive concepts of the present disclosure. In some embodiments, the photonic device 300 may include a plurality of optical and/or electrical components which may be interconnected. Moreover, it is noted that the process steps of method 200, including any descriptions given with reference to the figures are merely exemplary and are not intended to be limiting beyond what is specifically recited in the claims that follow.

The method 200 begins at block 202 where a substrate is provided. Referring to the example of FIG. 3A, in an embodiment of block 202, a substrate 302 is provided. In some embodiments, the substrate 302 may be a semiconductor substrate such as a silicon substrate. The substrate 302 may include various layers, including conductive or insulating layers formed on a semiconductor substrate. The substrate 302 may include various doping configurations depending on design requirements as is known in the art. The substrate 302 may also include other semiconductors such as germanium, silicon carbide (SiC), silicon germanium (SiGe), or diamond. Alternatively, the substrate 302 may include a compound semiconductor and/or an alloy semiconductor. Further, the substrate 302 may optionally include an epitaxial layer (epi-layer), may be strained for performance enhancement, may include a silicon-on-insulator (SOI) structure, and/or have other suitable enhancement features.

The method 200 proceeds to block 204 where a layer stack is formed over the substrate. Still referring to the example of FIG. 3A, in an embodiment of block 204, a layer stack 304 is formed over the substrate 302. In various examples, one or more layers of the layer stack 304 may be grown on the substrate 302, or one or more layers may be transferred from another substrate (e.g., such as during formation of an SOI wafer). In some cases, the layer stack 304 may be equivalently referred to a passive waveguide heterostructure. In the illustrated example, the layer stack 304 includes a lower cladding layer 306 formed over the substrate 302, a waveguide core layer 308 formed over the lower cladding layer 306, and an upper cladding layer 310 formed over the waveguide core layer 308. In some embodiments, the lower cladding layer 306 and the upper cladding layer 310 may include an oxide layer, such as a silicon oxide layer (SiO$_2$). In some examples, the lower cladding layer 306 and the upper cladding layer 310 may include a thermally grown oxide, a CVD-deposited oxide, and/or an ALD-deposited oxide. In some embodiments, the waveguide core layer 308 includes a silicon (Si) layer. However, in some cases, the waveguide core layer 308 may alternatively include silicon nitride (SiN), a polymer layer, a III-V material, silica, or other suitable waveguide core material. In some embodiments, the lower cladding layer 306 and the upper cladding layer 310 may have substantially the same refractive index, and a lower refractive index than the waveguide core layer 308. Because of the differences in the indices of refraction, the lower cladding layer 306 and the upper cladding layer 310 help provide optical confinement within the waveguide core layer 308. While some examples of layer compositions for the layer stack 304 have been described, it will be understood that other materials may be equally used without departing from the scope of the present disclosure. Further, in various embodiments, the terms "passive waveguide" or "passive waveguide heterostructure" may include any of a plurality of material systems configured to guide light along a particular direction, for example, by utilizing a waveguide core layer surrounded by cladding layers having a lower index of refraction than the waveguide core layer.

The method 200 proceeds to block 206 where an upper cladding layer of the layer stack is etched. Referring to the examples of FIGS. 3A and 3B, in an embodiment of block 206, the upper cladding layer 310 is etched. Initially, in some embodiments, a patterned masking layer 312, which forms a waveguide ridge for the photonic device 300, is formed over the layer stack 304. In some cases, the patterned masking layer 312 includes a patterned photoresist layer that is formed by depositing a photoresist layer over the photonic device 300, exposing the photoresist to a pattern, performing post-exposure bake processes, and developing the photoresist to form the patterned masking layer 312. In some embodiments, pattering the photoresist to form the patterned masking layer 312 may be performed using an electron beam (e-beam) lithography process. In some embodiments, the patterned masking layer 312 includes a hard mask (HM) layer, which itself may be patterned using a suitable photolithography process (e.g., photoresist deposition, exposure, baking, and developing) and etching process (e.g., a wet etch, dry etch, or combination thereof) to form the patterned HM layer. In some embodiments, the patterned HM layer may include an oxide layer (e.g., such as $SiO_2$) and/or a nitride layer (e.g., such as $Si_3N_4$). The patterned masking layer 312, whether including a patterned photoresist layer, a patterned hard mask layer, or a combination thereof, may then be used to protect regions of the substrate 302, and layers formed thereupon, while an etch process removes exposed portions of the upper cladding layer 310, as discussed below.

After formation of the patterned masking layer 312, and in a further embodiment of block 206, the upper cladding layer 310 is etched. For example, in some cases, a dry etching process is performed through the patterned masking element 312 to remove exposed portions of the upper cladding layer 310 and form a recess 314, as shown in FIG. 3B, thereby beginning to pattern the waveguide ridge for the photonic device 300. To be sure, in some embodiments, the etching process may include a wet etching process or a combination of dry and wet etching processes. In some embodiments, etching of the upper cladding layer 310 is performed using a fluorine-based chemistry such as $SF_6$, $NF_3$, $C_xF_y$, or other suitable chemistry. Alternatively, in some examples, etching of the upper cladding layer 310 is performed using a $CF_4/CHF_3/O_2$ mixture. In various embodiments, the etching process used to etch the upper cladding layer 310 is selective to the waveguide core layer 308, such that the etch of the upper cladding layer 310 effectively stops upon reaching the waveguide core layer 308. After etching the upper cladding layer 310, the patterned masking layer 312 may be removed, for example, using a solvent or ashing process if the patterned masking layer 312 includes a patterned photoresist layer, or using a wet and/or dry etching process if the patterned masking layer 312 includes a patterned HM layer. It is further noted that in some examples, after etching the upper cladding layer 310, a lateral surface profile 316 of the upper cladding layer 310 may include a slanted or tapered surface.

Figure 3C:
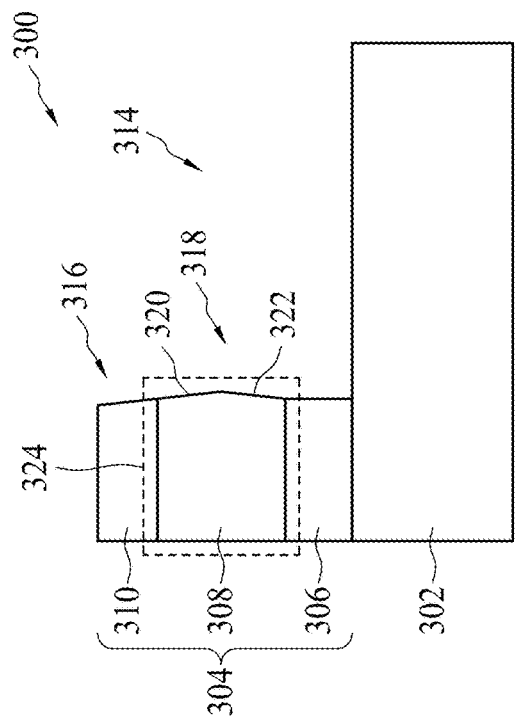

The method 200 proceeds to block 208 where a waveguide core layer of the layer stack is etched. Referring to the examples of FIGS. 3B and 3C, in an embodiment of block 208, the waveguide core layer 308 is etched. In some embodiments, the waveguide core layer 308 may be etched using a dry etching process, using the previously patterned upper cladding layer 310 as a masking element, to remove exposed portions of the waveguide core layer 308 and increase a size of the recess 314, as shown in FIG. 3C, thereby continuing to pattern the waveguide ridge for the photonic device 300. To be sure, in some embodiments, the etching process may include a wet etching process or a combination of dry and wet etching processes. In some embodiments, etching of the waveguide core layer 308 is performed using a chlorine or fluorine-based chemistry such as $Cl_2$, $SF_6$, $NF_3$, $C_xF_y$, or other suitable chemistry. Alternatively, in some examples, etching of the waveguide core layer 308 is performed using a Bosch etching process (plasma etching process) that uses alternating cycles of $SF_6$ gas and $C_4F_8$ gas. In various embodiments, the etching process used to etch the waveguide core layer 308 is selective to the lower cladding layer 306, such that the etch of the waveguide core layer 308 effectively stops upon reaching the lower cladding layer 306. It is noted that in some examples, after etching the waveguide core layer 308, a lateral surface profile 318 of the waveguide core layer 308 may be substantially vertical (e.g., perpendicular to a top surface of the substrate 302). In some embodiments, after etching the waveguide core layer 308, the lateral surface profile 316 of the upper cladding layer 310 may still include a slanted or tapered surface.

Figure 3D:
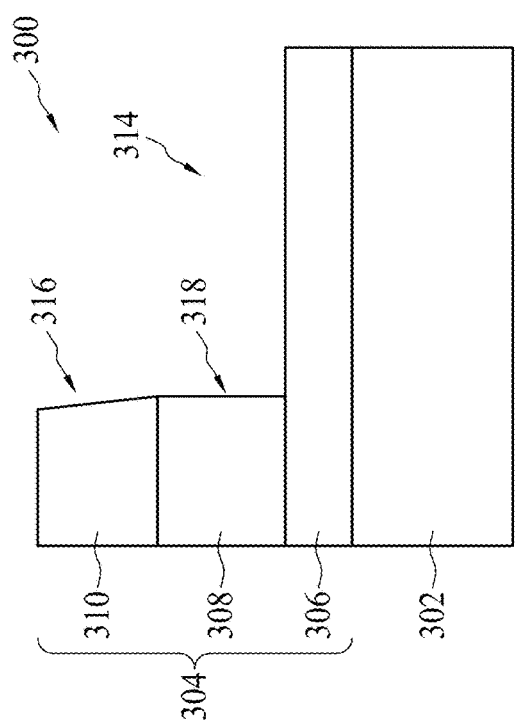

The method 200 proceeds to block 210 where a lower cladding layer of the layer stack is etched using a high-pressure etch. Referring to the examples of FIGS. 3C and 3D, in an embodiment of block 210, the lower cladding layer 306 is etched. In some embodiments, the lower cladding layer 306 may be etched using a dry etching process, using the previously patterned upper cladding layer 310 and waveguide core layer 308 as a masking element, to remove exposed portions of the lower cladding layer 306 and further increase a size of the recess 314, as shown in FIG. 3D, thereby continuing to pattern (or substantially finalizing the patterning of) the waveguide ridge for the photonic device 300. In some embodiments, etching of the lower cladding layer 306 is performed using a fluorine-based chemistry such as $SF_6$, $NF_3$, $C_xF_y$, or other suitable chemistry. Alternatively, in some examples, etching of the lower cladding layer 306 is performed using a $CF_4/CHF_3/O_2$ mixture. More generally, in various examples, the etching process used to etch the lower cladding layer 306 may include a high-pressure etch (e.g., greater than or equal to about 40 MPa). In accordance with some embodiments, using a high-pressure etch to etch the lower cladding layer 306 simultaneously etches the waveguide core layer 308 such that the lateral surface profile 318 of the waveguide core layer 308 will now include a convex prism or a convex ridge profile. The convex prism or convex ridge profile of the waveguide core layer 308, as shown in FIG. 3D, includes a top surface 320 and a bottom surface 322 having slanting (e.g., tapered), but oppositely oriented, surfaces. As a result of forming the convex prism or convex ridge profile of the waveguide core layer 308, optical loss or malfunction (e.g., that may be due to an output field shift) of an optical waveguide including the waveguide core layer 308 can be reduced or eliminated. Stated another way, the convex prism or convex ridge profile of the waveguide core layer 308 helps to improve spot size and depth control of light that is output from the waveguide core layer 308 (e.g., such as via the output facet 110 of the optical waveguide 108). Moreover, since the high-pressure etch of the lower cladding layer 306 can be used to form the slanting, but oppositely oriented, top and bottom surfaces 320, 322 of the waveguide core layer 308 simultaneously, there is no additional complexity or cost added to the process flow. Stated another way, and in accordance with the method 200, the convex prism or convex ridge profile of the waveguide core layer 308 may be created solely by the high-pressure etch of the lower cladding layer 306. While the present example is described as using a dry etching process to etch the lower cladding layer 306, in at least some embodiments the etching process may include a wet etching process or a combination of dry and wet etching processes. Also, in some cases, the etching process used to etch the lower cladding layer 306 may be selective to the substrate 302, such that the etch of the lower cladding layer 306 effectively stops upon reaching the substrate 302. To be sure, in some cases, the etch of the lower cladding layer 306 may at least partially etch a top surface of the substrate 302.

Figure 4:
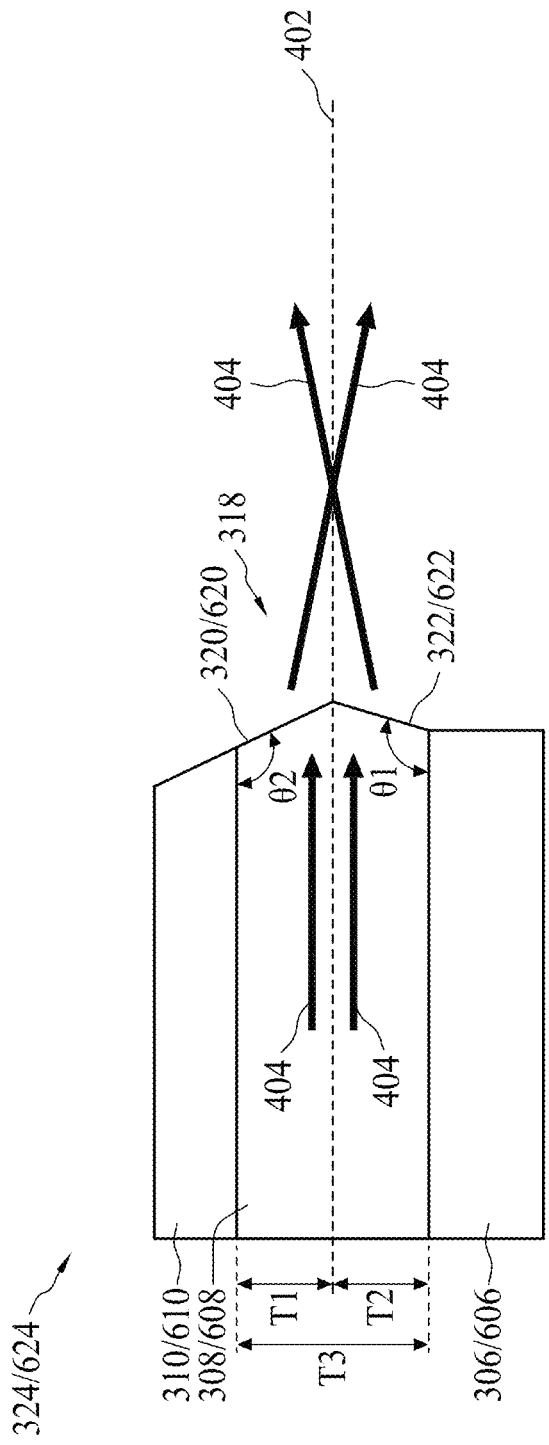
FIG. 4 illustrates a zoomed-in view of a portion of the photonic device shown in FIG. 3D, in accordance with some embodiments.

In some embodiments, after etching the lower cladding layer 306, the lateral surface profile 316 of the upper cladding layer 310 may still include a slanted or tapered surface. However, in various examples, the high-pressure etch of the lower cladding layer 306 may also at least partially etch a top surface of the upper cladding layer 310, thereby reducing a total thickness of the upper cladding layer 310. With respect to the lateral surface profile 318 of the waveguide core layer 308, it has been shown and described that the high-pressure etch to etch the lower cladding layer 306 will simultaneously etch the waveguide core layer 308 to form a convex prism or convex ridge profile in the lateral surface profile 318 of the waveguide core layer 308. To provide more detail regarding the convex prism or convex ridge profile of the waveguide core layer 308, reference is made to FIG. 4 which illustrates a zoomed-in view of a portion 324 of the photonic device 300, discussed above. As shown, the portion 324 includes the upper cladding layer 310, the waveguide core layer 308, and the lower cladding layer 306. The lateral surface profile 318 of the waveguide core layer 308, which includes the convex prism or convex ridge profile composed of the slanting, but oppositely oriented, top and bottom surfaces 320, 322, is also illustrated. In some embodiments, the waveguide core layer 308 has a thickness 'T3'. A dashed line 402 is shown as passing through a plane including an apex of the lateral surface profile 318, where the dashed line 402 bisects the waveguide core layer 308 into an upper portion having a thickness 'T1' and a lower portion having a thickness 'T2'. In some cases, T1 may be equal to T2. However, in other cases, T1 and T2 may be different. In some embodiments, the thickness 'T1' may correspond to a vertical span of the slanted top surface 320, and the thickness 'T2' may correspond to a vertical span of the slanted, but oppositely oriented, bottom surface 322. In various examples, T1≥(1/6)*T3. More generally, in some cases, (1/2)*T3≥T1≥(1/6)*T3. In some embodiments, T2≥(1/6)*T3. More generally, in some cases, (1/2)*T3≥T2≥(1/6)*T3. FIG. 4 also illustrates an angle θ1 and an angle θ2. The angle θ1 is measured between the lower cladding layer 306 and the bottom surface 322 of the waveguide core layer 308, and the angle θ2 is measured between the upper cladding layer 310 and the top surface 320 of the waveguide core layer 308. In some embodiments, the angle θ1 and the angle θ2 may be greater than 90 degrees. In addition, while the angle θ1 and the angle θ2 may in some cases be the same, in some embodiments they may be different. FIG. 4 further illustrates exemplary light rays 404 traveling through and exiting the waveguide core layer 308 via the slanting, but oppositely oriented, top and bottom surfaces 320, 322. In particular, because of the convex prism or convex ridge profile of the waveguide core layer 308, the exiting light rays 404 will provide a more focused and centered output spot size with enhanced output intensity. Thus, any potential waveguide optical loss or malfunction (e.g., that may be due to an output field shift) can be mitigated or avoided.

Figure 3E:
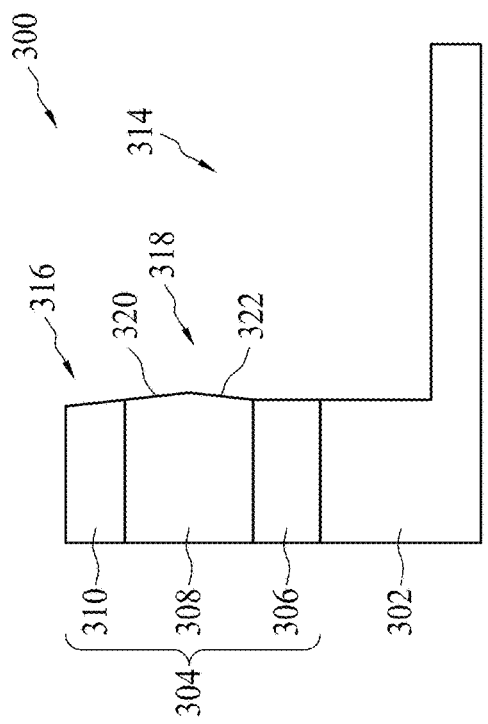

The method 200 then proceeds to block 212 where the substrate is optionally etched. Referring to the examples of FIGS. 3D and 3E, in an embodiment of block 212, the substrate 302 is etched. In some embodiments, the substrate 302 may be etched using a dry etching process, using the previously patterned upper cladding layer 310, waveguide core layer 308, and lower cladding layer 306 as a masking element, to remove at least a top portion of exposed regions of the substrate 302 and further increase a size of the recess 314, as shown in FIG. 3E, thereby finalizing the patterning of the waveguide ridge for the photonic device 300. To be sure, in some embodiments, the etching process may include a wet etching process or a combination of dry and wet etching processes. In some embodiments, etching of the substrate 302 is performed using a chlorine or fluorine-based chemistry such as $Cl_2$, $SF_6$, $NF_3$, $C_xF_y$, or other suitable chemistry. Alternatively, in some examples, etching of the substrate 302 is performed using a Bosch etching process (plasma etching process) that uses alternating cycles of $SF_6$ gas and $C_4F_8$ gas. It is noted that in some examples, after etching the substrate 302, the lateral surface profile 316 of the upper cladding layer 310 and the lateral surface profile 318 of the waveguide core layer 308 may remain substantially the same as they were prior to etching the substrate 302. In addition, and in some embodiments, formation of the waveguide ridge for the photonic device 300 may be substantially complete after etching the lower cladding layer 306 (block 210) but is not limited thereto. However, in at least some cases, etching of the substrate 302 may be performed as a result of fabrication of other, ex-situ devices, that are monolithically integrated with the photonic device 300 on the substrate 302 (e.g., such as LEDs, detectors, other optical components, or other electrical components).

The photonic device 300 fabricated according to the method 200 may undergo further processing to form various features and regions known in the art. For example, subsequent processing may form various other optical components (e.g., such as lasers, photodetectors, phase modulators, mixers, and/or other type of optical component), other waveguide structures, and/or other electrical components integrated on the substrate 302. In addition, contacts/vias/lines and multilayer interconnect features (e.g., metal layers and interlayer dielectrics) may also be formed on the substrate 302 including the photonic device 300, and may be configured to connect various features to form a functional circuit that, together with the photonic device 300, may be used to perform signal processing or other circuit functions in both optical and electrical domains. Moreover, additional process steps may be implemented before, during, and after the method 200, and some process steps described above may be replaced or eliminated in accordance with various embodiments of the method 200.

Figure 5:
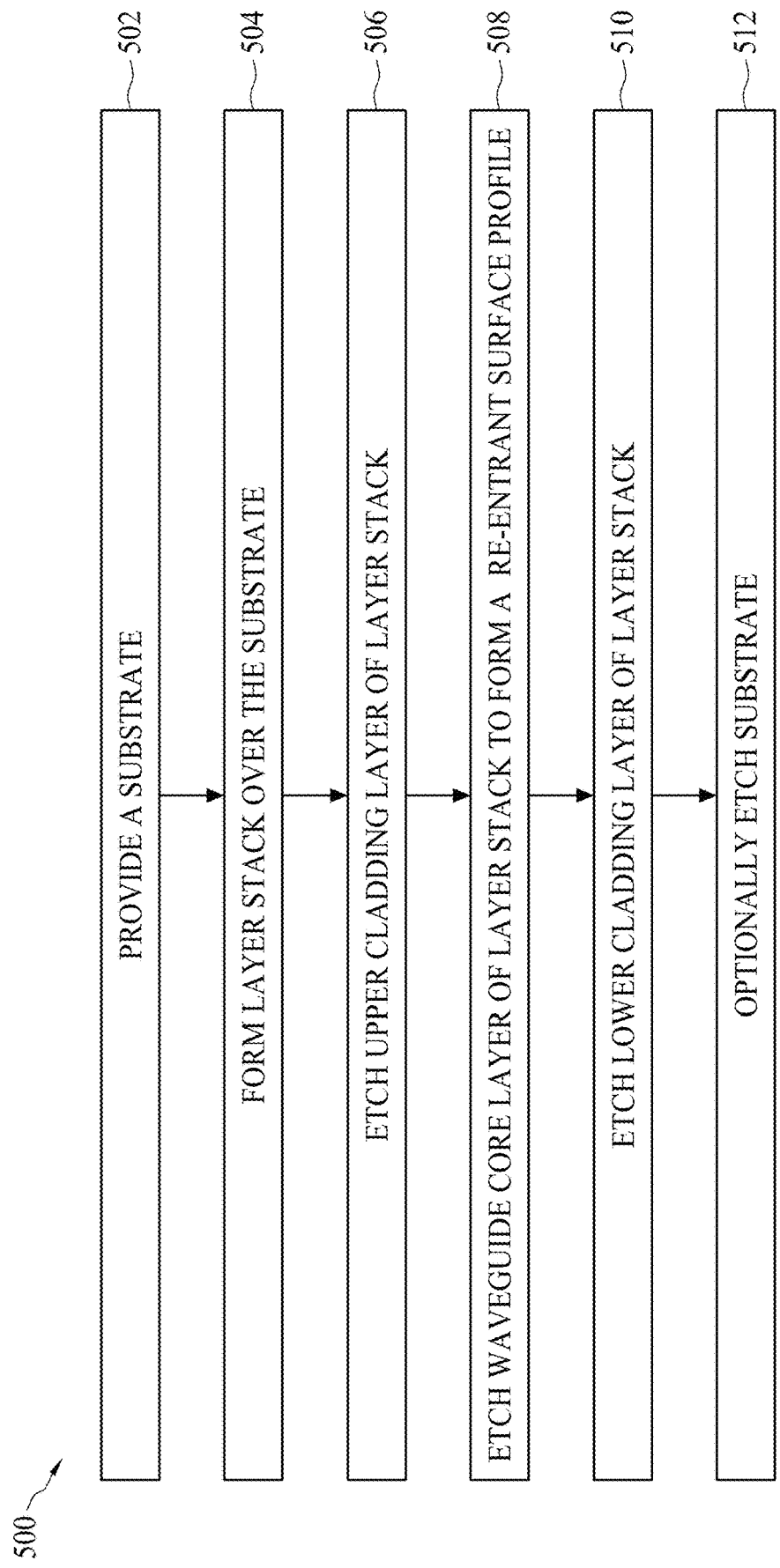
FIG. 5 is a flow chart of a method of fabrication of a photonic device having a waveguide core with a convex profile, in accordance with alternative embodiments.

Referring now to FIG. 5, illustrated therein is a method 500 of semiconductor fabrication including fabrication of a photonic device 600 having a waveguide core with a convex profile, in accordance with various embodiments. The method 500 is substantially similar to the method 200 in many respects and the description of the method 200 above also applies to the method 500. Thus, for clarity of discussion, focus is given here to the differences between the method 500 and the method 200, as discussed in further detail below. Like the method 200, the method 500 may also be used to fabricate at least a portion of the photonic device 100, described above with reference to FIG. 1. Thus, one or more aspects discussed above with reference to the photonic device 100 may also apply to the method 500. More particularly, the method 500 is discussed below with reference to FIGS. 6A-6E, which provide cross-sectional views of an embodiment of the photonic device 600 along a plane substantially parallel to a plane defined by section AA' of FIG. 1 (e.g., at the output facet 110 of the optical waveguide 108). It is further noted that, in some embodiments, the photonic device 600 may include various other devices and features, such as other types of optical components and electrical components, as discussed above.

The method 500 begins at block 502 where a substrate is provided. Referring to the example of FIG. 6A, in an embodiment of block 502, a substrate 602 is provided. In some embodiments, the substrate 602 may be substantially the same as the substrate 302, discussed above with reference to the method 200. The method 500 proceeds to block 504 where a layer stack is formed over the substrate. Still referring to the example of FIG. 6A, in an embodiment of block 504, a layer stack 604 is formed over the substrate 602. The layer stack 604 may be substantially the same as the layer stack 304, discussed above. For instance, the layer stack 604 includes a lower cladding layer 606 formed over the substrate 602, a waveguide core layer 608 formed over the lower cladding layer 606, and an upper cladding layer 610 formed over the waveguide core layer 608. In various embodiments, the lower cladding layer 606, the waveguide core layer 608, and the upper cladding layer 610 are substantially the same as the lower cladding layer 306, the waveguide core layer 308, and the upper cladding layer 310, discussed above.

Figure 6B:
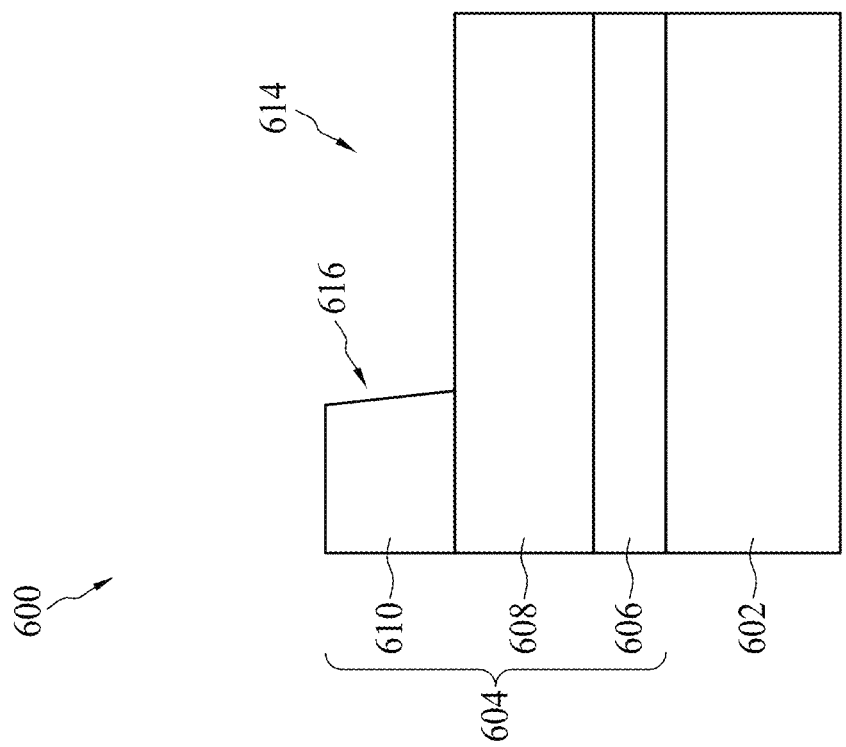
Figure 6A:
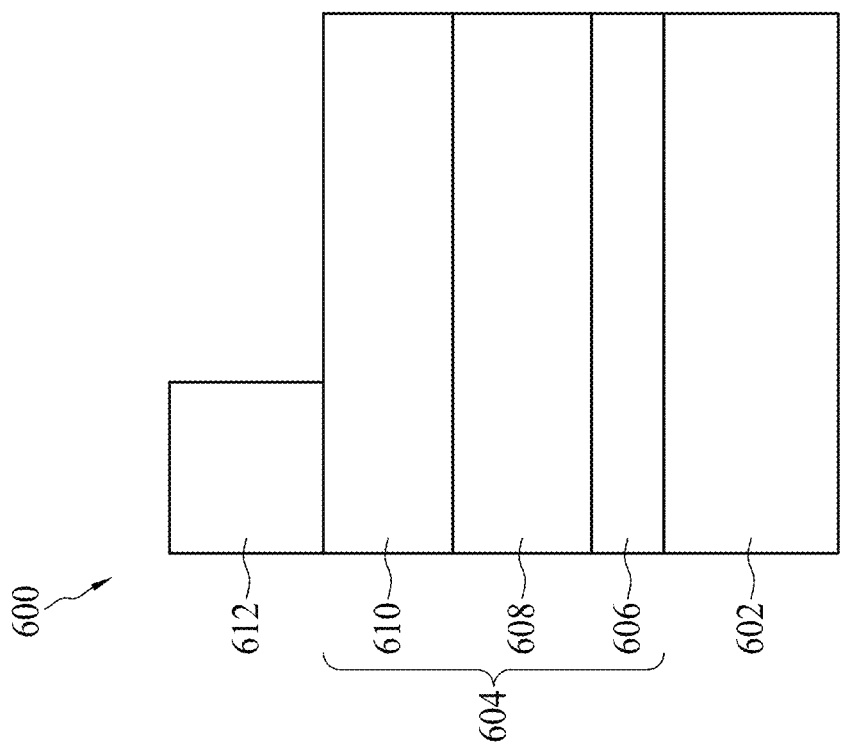

The method 500 proceeds to block 506 where an upper cladding layer of the layer stack is etched. Referring to the examples of FIGS. 6A and 6B, in an embodiment of block 506, the upper cladding layer 610 is etched. Initially, in some embodiments and similar to the method 200, a patterned masking layer 612, which forms a waveguide ridge for the photonic device 600, is formed over the layer stack 604. In various embodiments, the patterned masking layer 612 may include a patterned photoresist layer, a patterned HM layer, or a combination thereof, as discussed above. In some examples, the patterned masking layer 612 may be used to protect regions of the substrate 602, and layers formed thereupon, while an etch process removes exposed portions of the upper cladding layer 610. After formation of the patterned masking layer 612, and in a further embodiment of block 506, the upper cladding layer 610 is etched. For example, in some cases, a dry etching process is performed through the patterned masking element 612 to remove exposed portions of the upper cladding layer 610 and form a recess 614, as shown in FIG. 6B, thereby beginning to pattern the waveguide ridge for the photonic device 600. To be sure, in some embodiments, the etching process may include a wet etching process or a combination of dry and wet etching processes. In some embodiments, etching of the upper cladding layer 610 is performed using a fluorine-based chemistry such as $SF_6$, $NF_3$, $C_xF_y$, or other suitable chemistry. Alternatively, in some examples, etching of the upper cladding layer 610 is performed using a $CF_4/CHF_3/O_2$ mixture. In various embodiments, the etching process used to etch the upper cladding layer 610 is selective to the waveguide core layer 608, such that the etch of the upper cladding layer 610 effectively stops upon reaching the waveguide core layer 608. After etching the upper cladding layer 610, the patterned masking layer 612 may be removed, for example, using a solvent or ashing process if the patterned masking layer 612 includes a patterned photoresist layer, or using a wet and/or dry etching process if the patterned masking layer 612 includes a patterned HM layer. It is further noted that in some examples, after etching the upper cladding layer 610, a lateral surface profile 616 of the upper cladding layer 610 may include a slanted or tapered surface.

The method 500 proceeds to block 508 where a waveguide core layer of the layer stack is etched to form a re-entrant surface profile. Referring to the examples of FIGS. 6B and 6C, in an embodiment of block 508, the waveguide core layer 608 is etched. In some embodiments, the waveguide core layer 608 may be etched using a dry etching process, using the previously patterned upper cladding layer 610 as a masking element, to remove exposed portions of the waveguide core layer 608 and increase a size of the recess 614, as shown in FIG. 6C, thereby continuing to pattern the waveguide ridge for the photonic device 600. In contrast to the method 200, discussed above, the etching of the waveguide core layer 608 forms a re-entrant (e.g., pointing or slanting inwards) lateral surface profile 618 within the etched waveguide core layer 608. In some embodiments, the etching of the waveguide core layer 608 to form the re-entrant lateral surface profile 618 is performed using a top surface imaging (TSI) etch. As discussed in more detail below, the re-entrant lateral surface profile 618 provides a bottom surface 622 of a subsequently formed convex prism or convex ridge profile of the waveguide core layer 608 (FIG. 6D). In accordance with various embodiments, formation of the re-entrant lateral surface profile 618 defines the angle $\theta 1$, as discussed above, that is here measured between the lower cladding layer 606 and the re-entrant lateral surface profile 618 of the waveguide core layer 308. As previously discussed, the angle $\theta 1$ may be greater than 90 degrees. Further, in the present example, the angle $\theta 1$ may be independently adjusted (e.g., by tuning the etch of the waveguide core layer 608) to provide a desired angle for the bottom surface 622 of the subsequently formed convex prism or convex ridge profile of the waveguide core layer 608, as discussed further below. For avoidance of doubt, in some embodiments, the waveguide core layer 608 etching process may include a wet etching process or a combination of dry and wet etching processes. In some embodiments, etching of the waveguide core layer 608 is performed using a chlorine or fluorine-based chemistry such as $Cl_2$, $SF_6$, $NF_3$, $C_xF_y$, or other suitable chemistry. Alternatively, in some examples, etching of the waveguide core layer 608 is performed using a Bosch etching process (plasma etching process) that uses alternating cycles of $SF_6$ gas and $C_4F_8$ gas. In various embodiments, the etching process used to etch the waveguide core layer 608 is selective to the lower cladding layer 606, such that the etch of the waveguide core layer 608 effectively stops upon reaching the lower cladding layer 606. In some embodiments, after etching the waveguide core layer 608, the lateral surface profile 616 of the upper cladding layer 610 may still include a slanted or tapered surface.

The method 500 proceeds to block 510 where a lower cladding layer of the layer stack is etched. Referring to the examples of FIGS. 6C and 6D, in an embodiment of block 510, the lower cladding layer 606 is etched. In some embodiments, the lower cladding layer 606 may be etched using a dry etching process, using the previously patterned upper cladding layer 610 and waveguide core layer 608 as a masking element, to remove exposed portions of the lower cladding layer 606 and further increase a size of the recess 614, as shown in FIG. 6D, thereby continuing to pattern (or substantially finalizing the patterning of) the waveguide ridge for the photonic device 600. In accordance with some embodiments, etching the lower cladding layer 606 simultaneously etches (or tapers) a top portion of the waveguide core layer 608, while a bottom portion of the waveguide core layer 608 retains the re-entrant lateral surface profile 618, and such that an overall lateral surface profile 619 of the waveguide core layer 608 will now include a convex prism or a convex ridge profile. The convex prism or convex ridge profile of the waveguide core layer 608, as shown in FIG. 6D, includes a top surface 620 and the bottom surface 622 having slanting (e.g., tapered), but oppositely oriented, surfaces. In some embodiments, the etching of the lower cladding layer 606 to etch the top portion of the waveguide core layer 608 and form the overall lateral surface profile 619 is performed using a TSI etch. In accordance with various embodiments, etching of the lower cladding layer 606 defines the angle θ2, as discussed above, that is measured between the upper cladding layer 610 and the top surface 620 of the waveguide core layer 308. As previously discussed, the angle θ2 may be greater than 90 degrees. Further, in the present example, the angle θ2 may be independently adjusted (e.g., by tuning the etch of the lower cladding layer 606) to provide a desired angle for the top surface 620 of the convex prism or convex ridge profile of the waveguide core layer 608. Thus, in accordance with the method 500, the convex prism or convex ridge profile of the waveguide core layer 608 may be created using a two-step process including (i) formation of the re-entrant lateral surface profile 618 by etching the waveguide core layer 608 and (ii) tapering a top portion of the waveguide core layer 608 by way of the lower cladding layer 606 etching process. By being able to independently adjust the angles θ1, θ2 of the top and bottom portions of the waveguide core layer 608 (e.g., in contrast to the method 200 where both angles θ1, θ2 are defined by the high-pressure etch of the lower cladding layer 306), it is evident that formation of the convex prism or convex ridge profile of the waveguide core layer 608 using a two-step process offers more flexibility. Also, while the present example is described as using a dry etching process to etch the lower cladding layer 606, in at least some embodiments the etching process may include a wet etching process or a combination of dry and wet etching processes. Further, in some embodiments, etching of the lower cladding layer 606 is performed using a fluorine-based chemistry such as $SF_6$, $NF_3$, $C_xF_y$, or other suitable chemistry. Alternatively, in some examples, etching of the lower cladding layer 606 is performed using a $CF_4/CHF_3/O_2$ mixture. Also, in some cases, the etching process used to etch the lower cladding layer 606 may be selective to the substrate 602, such that the etch of the lower cladding layer 606 effectively stops upon reaching the substrate 602. To be sure, in some cases, the etch of the lower cladding layer 606 may at least partially etch a top surface of the substrate 602.

In some embodiments, after etching the lower cladding layer 606, the lateral surface profile 616 of the upper cladding layer 610 may still include a slanted or tapered surface. However, in various examples, the etch of the lower cladding layer 606 may also at least partially etch a top surface of the upper cladding layer 610, thereby reducing a total thickness of the upper cladding layer 610. In addition, to provide more detail regarding the convex prism or convex ridge profile of the waveguide core layer 608, reference is again made to FIG. 4 which illustrates a zoomed-in view of a portion 624 of the photonic device 600, discussed above. In some embodiments, the portion 624 may be substantially the same as the portion 324, discussed above. Thus, it will be understood that the previous discussion of FIG. 4, with reference to the method 200, also applies in the present example of the method 500.

The method 500 then proceeds to block 512 where the substrate is optionally etched. Referring to the examples of FIGS. 6D and 6E, in an embodiment of block 512, the substrate 602 is etched. In some embodiments, the substrate 602 may be etched using a dry etching process, using the previously patterned upper cladding layer 610, waveguide core layer 608, and lower cladding layer 606 as a masking element, to remove at least a top portion of exposed regions of the substrate 602 and further increase a size of the recess 614, as shown in FIG. 6E, thereby finalizing the patterning of the waveguide ridge for the photonic device 600. To be sure, in some embodiments, the etching process may include a wet etching process or a combination of dry and wet etching processes. In some embodiments, etching of the substrate 602 is performed using a chlorine or fluorine-based chemistry such as $Cl_2$, $SF_6$, $NF_3$, $C_xF_y$, or other suitable chemistry. Alternatively, in some examples, etching of the substrate 602 is performed using a Bosch etching process (plasma etching process) that uses alternating cycles of $SF_6$ gas and $C_4F_8$ gas. It is noted that in some examples, after etching the substrate 602, the lateral surface profile 616 of the upper cladding layer 610 and the lateral surface profile 619 of the waveguide core layer 608 may remain substantially the same as they were prior to etching the substrate 602. In addition, and in some embodiments, formation of the waveguide ridge for the photonic device 600 may be substantially complete after etching the lower cladding layer 606 (block 510) but is not limited thereto. However, in at least some cases, etching of the substrate 602 may be performed as a result of fabrication of other, ex-situ devices, that are monolithically integrated with the photonic device 600 on the substrate 602 (e.g., such as LEDs, detectors, other optical components, or other electrical components).

The photonic device 600 fabricated according to the method 500 may undergo further processing to form various features and regions known in the art. For example, subsequent processing may form various other optical components (e.g., such as lasers, photodetectors, phase modulators, mixers, and/or other type of optical component), other waveguide structures, and/or other electrical components integrated on the substrate 602. In addition, contacts/vias/lines and multilayer interconnect features (e.g., metal layers and interlayer dielectrics) may also be formed on the substrate 602 including the photonic device 600, and may be configured to connect various features to form a functional circuit that, together with the photonic device 600, may be used to perform signal processing or other circuit functions in both optical and electrical domains. Moreover, additional process steps may be implemented before, during, and after the method 500, and some process steps described above may be replaced or eliminated in accordance with various embodiments of the method 500.

Figure 7:
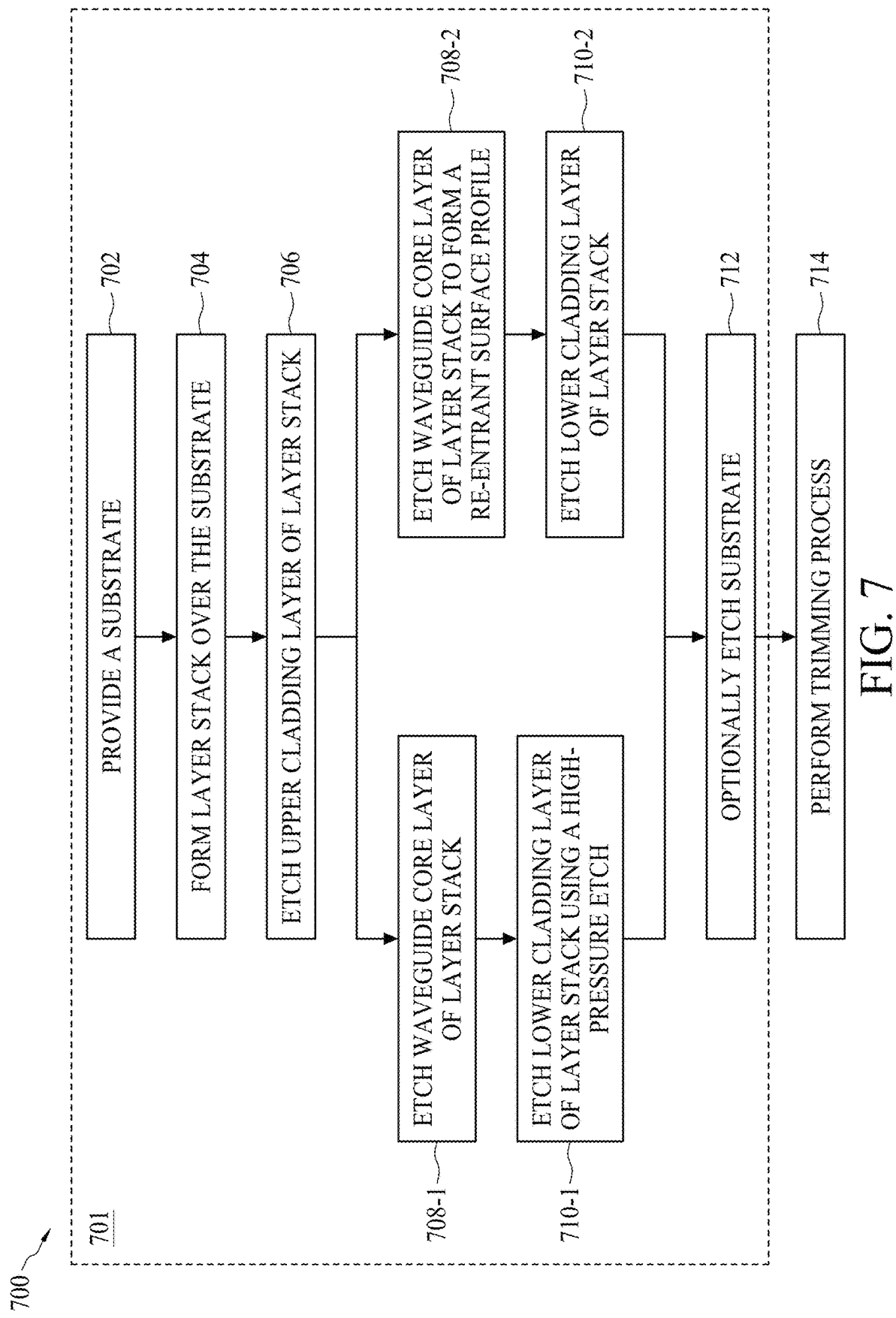
FIG. 7 is a flow chart of a method of fabrication of a photonic device having a waveguide core with a convex profile, in accordance with yet other embodiments.

With reference to FIG. 7, illustrated therein is a method 700 of semiconductor fabrication including fabrication of a photonic device 800 having a waveguide core with a convex profile, in accordance with various embodiments. The method 700 is substantially similar to the methods 200, 500 in many respects and the description of the methods 200, 500 above also applies to the method 700. Thus, for clarity of discussion, attention is given here to the differences provided in the method 700. Like the methods 200, 500, the method 700 may also be used to fabricate at least a portion of the photonic device 100, described above with reference to FIG. 1. Thus, one or more aspects discussed above with reference to the photonic device 100 may also apply to the method 700. More particularly, the method 700 is discussed below with reference to FIGS. 8A-8B, which provide cross-sectional views of an embodiment of the photonic device 800 along a plane substantially parallel to a plane defined by section AA' of FIG. 1 (e.g., at the output facet 110 of the optical waveguide 108). It is further noted that, in some embodiments, the photonic device 800 may include various other devices and features, such as other types of optical components and electrical components, as discussed above.

Figure 8B:
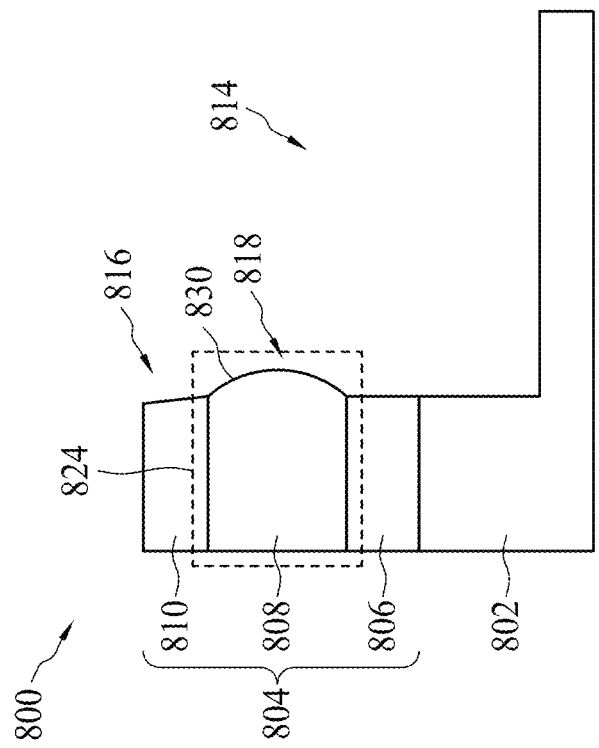
FIGS. 8A and 8B provide cross-sectional views of an embodiment of the photonic device along a plane substantially parallel to a plane defined by section AA' of FIG. 1, at different stages of processing according to the method of FIG. 7, in accordance with some embodiments.
Figure 8A:
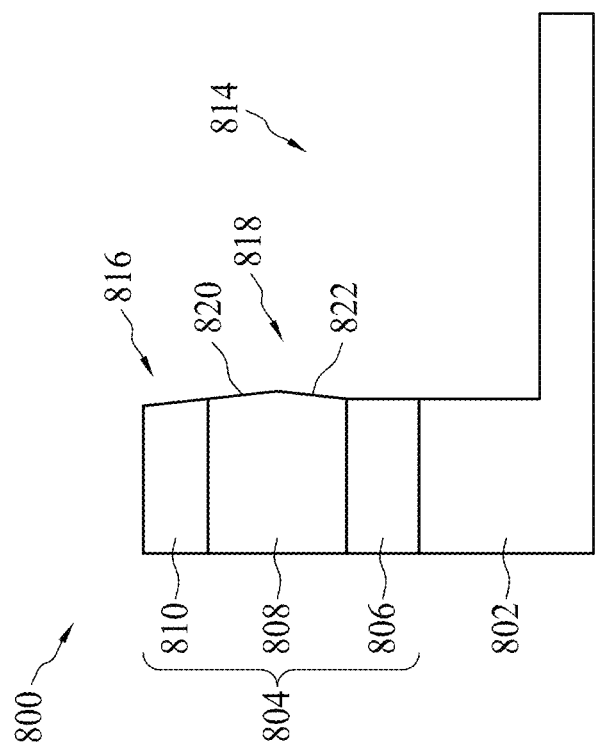

The method 700 begins at block 701 where a convex prism or a convex ridge profile may be formed within a waveguide core layer 808, as shown in FIG. 8A, which illustrates a substrate 802 and a layer stack 804 including a lower cladding layer 806, the waveguide core layer 808, and an upper cladding layer 810. In some embodiments, the substrate 802, the layer stack 804, the lower cladding layer 806, the waveguide core layer 808, and the upper cladding layer 810 may be substantially the same as described above with reference to the methods 200, 500. FIG. 8A also illustrates a lateral surface profile 816 of the upper cladding layer 810 (which may include a slanted or tapered surface), a lateral surface profile 818 of the waveguide core layer 808 including the convex prism or convex ridge profile, and a recess 814, which are substantially the same as similar features discussed above with reference to the methods 200, 500. The lateral surface profile 818 further includes a top surface 820 and a bottom surface 822 having slanting (e.g., tapered), but oppositely oriented, surfaces, similar to the top and bottom surfaces discussed above with reference to the methods 200, 500.

In accordance with the example of the method 700, the convex prism or convex ridge profile formed within the waveguide core layer 808 (shown in FIG. 8A) may be formed by either the method 200 or by the method 500, both of which have been previously discussed. Stated another way, the convex prism or convex ridge profile of the waveguide core layer 808 may be formed either solely by the high-pressure etch of the lower cladding layer (as in the method 200), or by using a two-step process including (i) formation of the re-entrant lateral surface profile and (ii) tapering a top portion of the waveguide core layer by way of the lower cladding layer etching process (as in the method 500). Specifically, at block 701 of the method 700, if the convex prism or convex ridge profile of the waveguide core layer 808 is formed by the high-pressure etch (e.g., the method 200), a substrate is provided (block 702), a layer stack is formed over the substrate (block 704), an upper cladding layer of the layer stack is etched (block 706), a waveguide core layer of the layer stack is etched (block 708-1), a lower cladding layer of the layer stack is etched using a high-pressure etch (block 710-1), and the substrate is optionally etched (block 712). Alternatively, at block 701 of the method 700, if the convex prism or convex ridge profile of the waveguide core layer 808 is formed by using the two-step process including (e.g., the method 500), a substrate is provided (block 702), a layer stack is formed over the substrate (block 704), an upper cladding layer of the layer stack is etched (block 706), a waveguide core layer of the layer stack is etched to form a re-entrant surface profile (block 708-2), a lower cladding layer of the layer stack is etched (block 710-2), and the substrate is optionally etched (block 712).

After forming the convex prism or convex ridge profile of the waveguide core layer 808 (at block 701), the method 700 proceeds to block 714 where a trimming process is performed. Referring to the examples of FIGS. 8A and 8B, in an embodiment of block 714, a ridge trimming process is performed to round or smooth out the lateral surface profile 818 of the waveguide core layer 808 including the convex prism or convex ridge profile, thereby converting the convex prism or convex ridge profile (of the lateral surface profile 818) into a convex lens or dome profile having a substantially smooth, rounded surface 830, as shown in FIG. 8B. In some embodiments, the ridge trimming process of block 714 includes a plasma etch process and is performed in a plasma chamber. This may be referred to as a plasma etching tuning process. In some embodiments, the ridge trimming process is performed using a chlorine or fluorine-based chemistry such as $Cl_2$, $SF_6$, $NF_3$, $C_xF_y$, or other suitable chemistry. In some examples, the ridge trimming process is performed using a Bosch etching process (plasma etching process) that uses alternating cycles of $SF_6$ gas and $C_4F_8$ gas. Alternatively, in some embodiments, the ridge trimming process may be performed using a chemical polishing process (e.g., using nitric acid, hydrofluoric acid, or other appropriate etching chemistry). Thus, in some cases, the chemical polishing process may include a wet etching process. In yet other embodiments, the ridge trimming process may be performed using a combination of the plasma etching tuning process and the chemical polishing process. It is also noted that the convex lens or dome profile (of the lateral surface profile 818) shown in FIG. 8B, for clarity of discussion, may not be drawn to scale and is illustrated as having a pronounced bow shape that extends across a substantial entirety of the lateral surface profile 818. It will be understood however, that in some embodiments, the bow shape of the convex lens or dome profile may not be as pronounced as shown and/or may not extend fully across the lateral surface profile 818, and in some cases the convex lens or down profile may simply include the convex prism or convex ridge profile (e.g., FIG. 8A) modified to have a rounded off ridge at the apex of the lateral surface profile 818.

The photonic device 800 fabricated according to the method 700 may undergo further processing to form various features and regions known in the art. For example, subsequent processing may form various other optical components (e.g., such as lasers, photodetectors, phase modulators, mixers, and/or other type of optical component), other waveguide structures, and/or other electrical components integrated on the substrate 802. In addition, contacts/vias/lines and multilayer interconnect features (e.g., metal layers and interlayer dielectrics) may also be formed on the substrate 802 including the photonic device 800, and may be configured to connect various features to form a functional circuit that, together with the photonic device 800, may be used to perform signal processing or other circuit functions in both optical and electrical domains. Moreover, additional process steps may be implemented before, during, and after the method 700, and some process steps described above may be replaced or eliminated in accordance with various embodiments of the method 700.

Figure 9:
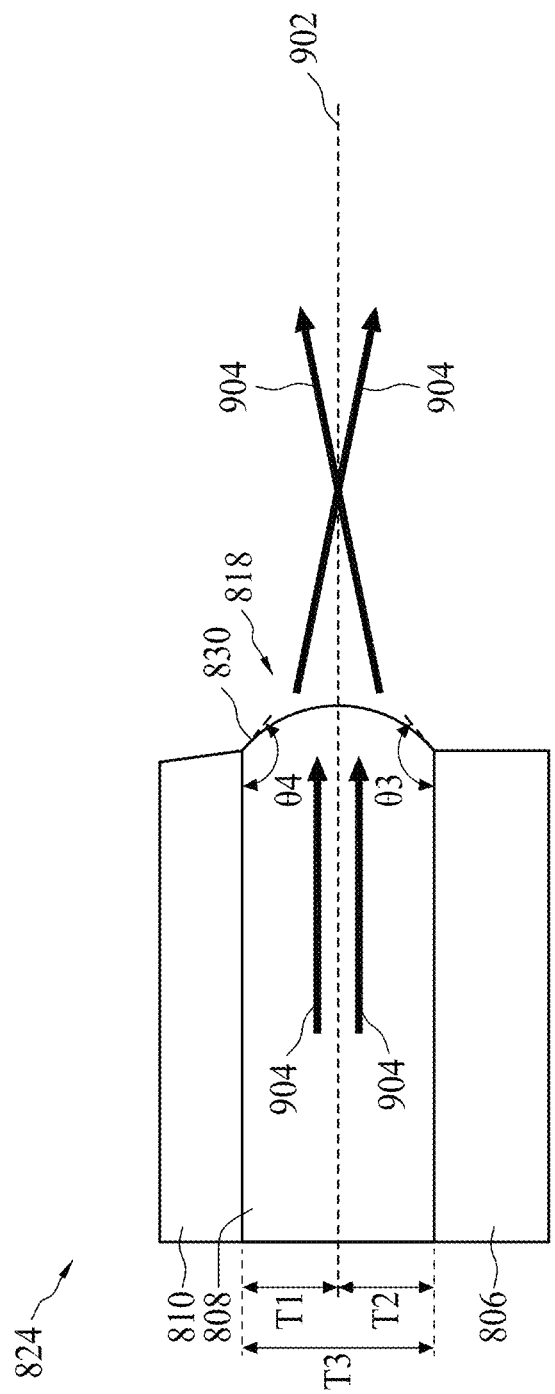
FIG. 9 illustrates a zoomed-in view of a portion of the photonic device shown in FIG. 8B, in accordance with some embodiments.

To provide more detail regarding the convex lens or dome profile of the lateral surface profile 818 of the waveguide core layer 808, reference is now made to FIG. 9 which illustrates a zoomed-in view of a portion 824 of the photonic device 800, discussed above. As shown, the portion 824 includes the upper cladding layer 810, the waveguide core layer 808, and the lower cladding layer 806. The lateral surface profile 818 of the waveguide core layer 808, which includes the convex lens or dome profile having the smooth, rounded surface 830, is also illustrated. In some embodiments, the waveguide core layer 808 has the thickness 'T3', as described above. A dashed line 902 is shown as passing through a plane that generally bisects the lateral surface profile 318 into an upper portion having the thickness 'T1' and a lower portion having the thickness 'T2', discussed above. In some cases, T1 may be equal to T2. However, in other cases, T1 and T2 may be different. In various examples, and as previously discussed, T1≥(1/6)*T3. More generally, in some cases, (1/2)*T3≥T1≥(1/6)*T3. Further, as noted above, T2≥(1/6)*T3. More generally, in some embodiments, (1/2)*T3≥T2≥(1/6)*T3. FIG. 9 also illustrates an angle θ3 and an angle θ4. The angle θ3 is measured between the lower cladding layer 806 and a line tangent to the lateral surface profile 818 of the lower portion of the waveguide core layer 808, and the angle θ4 is measured between the upper cladding layer 810 and a line tangent to the lateral surface profile 818 of the upper portion of the waveguide core layer 808. In some embodiments, the angle θ3 and the angle θ4 may be greater than 90 degrees. In addition, while the angle θ3 and the angle θ4 may in some cases be the same, in some embodiments they may be different. FIG. 9 further illustrates exemplary light rays 904 traveling through and exiting the waveguide core layer 808 via the smooth, rounded surface 830. In particular, because of the convex lens or dome profile of the waveguide core layer 808, the exiting light rays 904 will provide a more focused and centered output spot size with enhanced output intensity. Thus, any potential waveguide optical loss or malfunction (e.g., that may be due to an output field shift) can be mitigated or avoided.

Figure 10D:
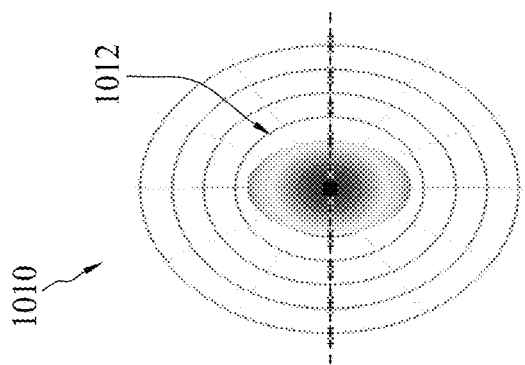
FIGS. 10A, 10B, 10C, and 10D provide an illustrative example of using embodiments of the present disclosure to control output field height, in accordance with some embodiments.
Figure 10C:
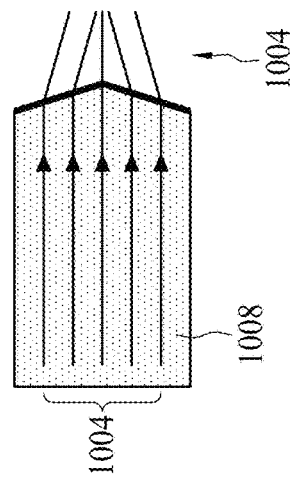
Figure 10B:
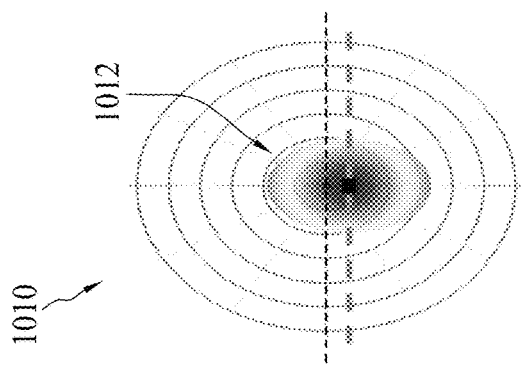
Figure 10A:
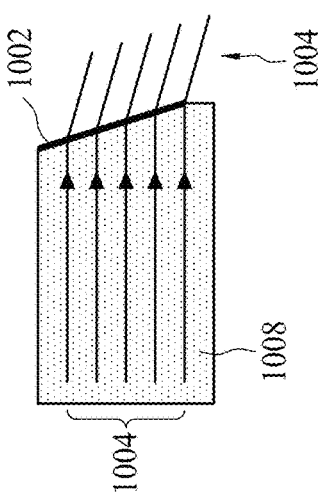

Referring now to FIGS. 10A-10D, shown therein is an illustrative example of how embodiments of the present disclosure may be used to control output field height (or output field shift). For instance, FIG. 10A shows an exemplary waveguide core layer 1008 having an undesirable tapered profile 1002, in accordance with at least some existing embodiments, and FIG. 10B shows an exemplary detector field 1010 corresponding to the waveguide core layer 1008 of FIG. 10A. In various examples, the tapered profile 1002 can cause an output field 1012 to shift off-target. To illustrate this point, FIG. 10A shows light rays 1004 traveling through and exiting the waveguide core layer 1008 via the tapered profile 1002. In particular, because of the tapered profile 1002, the exiting light rays 1004 may be diffracted (downward, in this example), and the light rays 1004 may not be matched to the detector, such that the output field 1012 is shifted downward and off-target with respect to the detector field 1010, as shown in FIG. 10B. In contrast, the waveguide core layer 1008 shown in FIG. 10C includes a convex prism or convex ridge profile, in accordance with embodiments of the present disclosure. FIG. 10D shows the exemplary detector field 1010 corresponding to the waveguide core layer 1008 of FIG. 10C. In various embodiments, the disclosed convex prism or convex ridge profile can act as a prism or convex lens to shift the output field back to the center (e.g., of the detector field 1010). To illustrate, the light rays 1004 traveling through and exiting the waveguide core layer 1008 via the slanting, but oppositely oriented, top and bottom surfaces of the convex prism or convex ridge profile will be well matched to the detector, such that the output field 1012 provides a more centered, on-target output spot size with respect to the detector field 1010, as shown in FIG. 10D, thereby providing enhanced optical performance. It will be understood that similar benefits may be achieved by using the convex lens or dome profile, also described above.

With reference to FIGS. 11A-11D, shown therein is an illustrative example of how embodiments of the present disclosure may be used to control output field diameter. For instance, FIG. 11A shows an exemplary waveguide core layer 1108 without a convex lateral profile and instead having a substantially vertical profile 1102, in accordance with at least some existing embodiments, and FIG. 11B shows an exemplary detector field 1110 corresponding to the waveguide core layer 1108 of FIG. 11A. In various examples, the profile 1102 can cause a divergence in light exiting therethrough. To illustrate this point, FIG. 11A shows light rays 1104 traveling through and exiting the waveguide core layer 1108 via the profile 1102. In particular, because of the profile 1102, the exiting light rays 1104 may diverge, such that the output field 1112 diverges, resulting in a larger output field diameter 'R1' within the detector field 1110, as shown in FIG. 11B. In contrast, the waveguide core layer 1108 shown in FIG. 11C includes a convex prism or convex ridge profile, in accordance with embodiments of the present disclosure. FIG. 11D shows the exemplary detector field 1110 corresponding to the waveguide core layer 1108 of FIG. 11C. In various embodiments, the disclosed convex prism or convex ridge profile can act as a prism or convex lens to converge the output field within a bullseye (e.g., of the detector field 1110). To illustrate, the light rays 1104 traveling through and exiting the waveguide core layer 1108 via the slanting, but oppositely oriented, top and bottom surfaces of the convex prism or convex ridge profile will be well matched to the detector, such that the output field 1112 provides a smaller output field diameter 'R2' (as compared to 'R1') within the detector field 1110, as shown in FIG. 11D, thereby providing enhanced optical performance. It will be understood that similar benefits may be achieved by using the convex lens or dome profile, also described above.

The various photonic devices shown and described, such as the photonic devices 100, 300, 600, 800, may be used in a wide variety of applications such as data communications (e.g., transceivers), biomedical applications (e.g., health monitoring lab-on-a-chip devices), defense and aerospace applications, astronomy, and others. To provide some additional detail regarding some of these potential applications, reference is made to FIGS. 12 and 13, which provide schematic diagrams of an exemplary silicon transceiver chip 1200 and an exemplary health monitoring system 1300, respectively.

Figure 12:
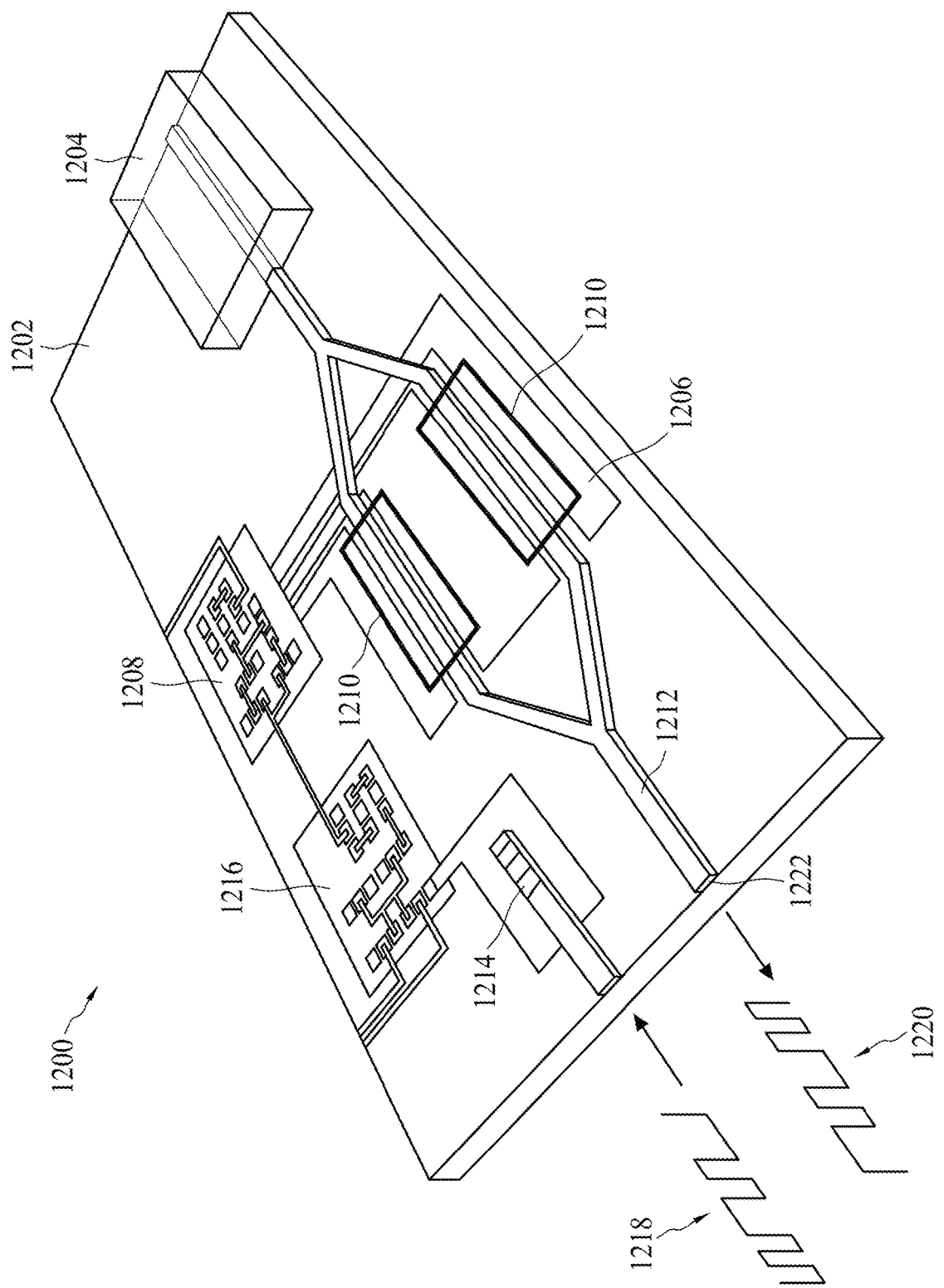
FIG. 12 provides a schematic diagram of an exemplary silicon transceiver chip including a photonic device having a waveguide core with a convex profile, in accordance with some embodiments.

As shown in the example of FIG. 12, the silicon transceiver chip 1200 includes a common substrate 1202 (e.g., such as silicon) which may include a plurality of optical devices and electrical devices. For example, the silicon transceiver chip 1200 may include a laser 1204, where the laser 1204 may include a III-V laser such as an InP laser or another suitable laser. The silicon transceiver chip 1200 may further include an electro-optic amplitude modulator 1206 and associated CMOS driver circuitry 1208. In some embodiments, the electro-optic amplitude modulator 1206 may be realized, at least in part, by the inclusion of phase modulators 1210 in both arms of a Mach-Zehnder interferometer. In various examples, the silicon transceiver chip 1200 may further include a waveguide 1212 and a photodetector 1214. In some cases, the waveguide 1212 may include a passive silicon waveguide, and the photodetector 1214 may include a SiGe photodetector with a built-in filter. The photodetector 1214 may also be coupled to CMOS circuitry 1216. As shown, an input signal 1218 is received by the silicon transceiver chip 1200 (e.g., via the photodetector 1214), and an output signal 1220 is transmitted from the silicon transceiver chip 1200 (e.g., via an output facet 1222 of the waveguide 1212). In some embodiments, the disclosed convex profile (e.g., convex prism/ridge or convex lens/dome) may be formed at least at the output facet 1222 of the waveguide 1212, although other embodiments are possible. Thus, for the light rays (e.g., generated by the laser 1204) traveling through the waveguide 1212 and exiting via the output facet 1222, optical loss is substantially mitigated, the output intensity is enhanced and on-target, and the optical performance of the waveguide 1212 (and the silicon transceiver chip 1200) is enhanced.

Figure 13:
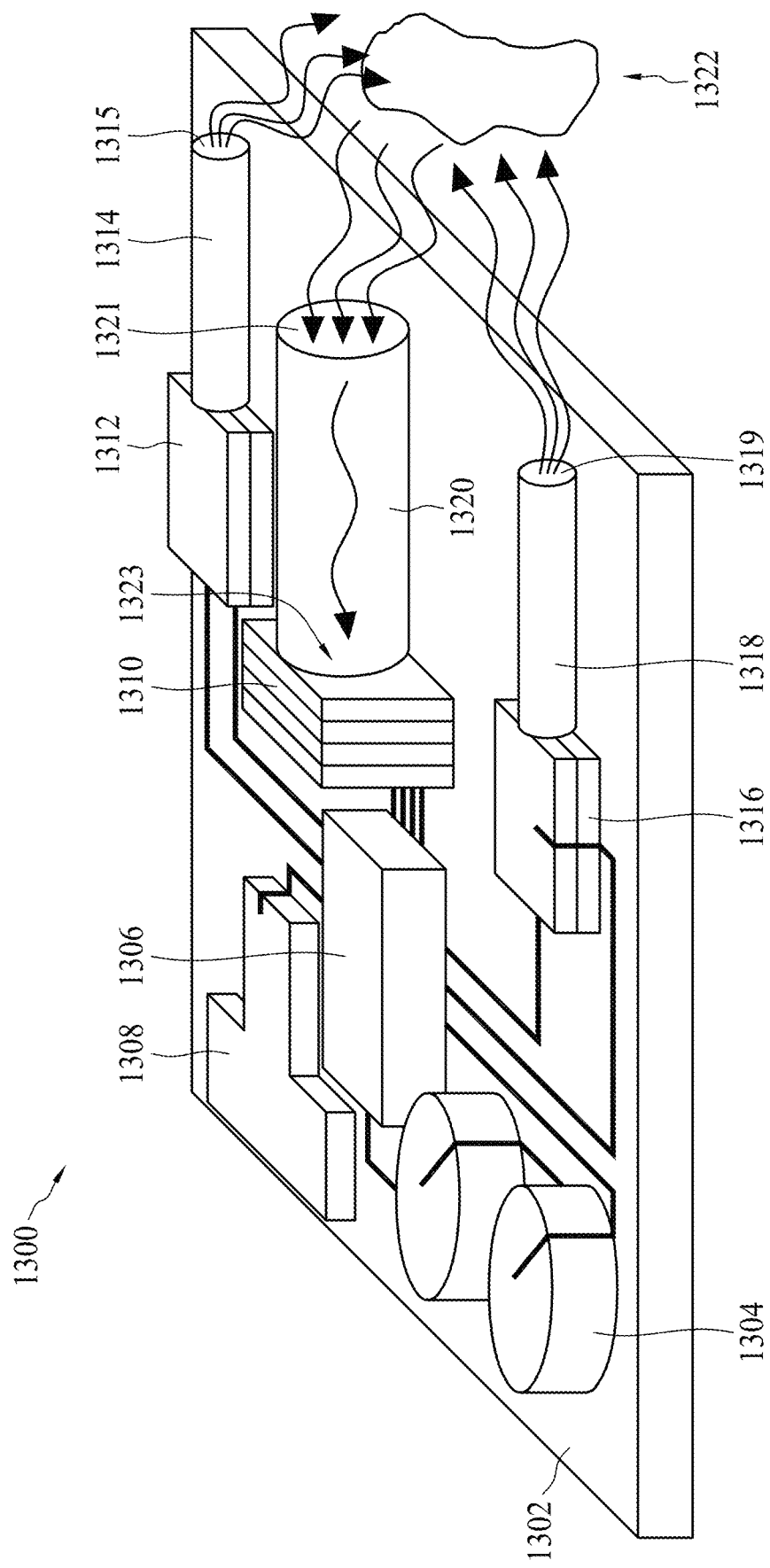
FIG. 13 provides a schematic diagram of an exemplary health monitoring system including a photonic device having a waveguide core with a convex profile, in accordance with some embodiments.

As shown in the example of FIG. 13, the health monitoring system 1300 includes a common substrate 1302 (e.g., such as silicon) which may include a plurality of optical devices and electrical devices. For example, the health monitoring system 1300 may include one or more batteries 1304, CMOS circuitry 1306, an antenna 1308 (e.g., such as an RF antenna), lasers 1312, 1316, an imaging array 1310, and waveguides 1314, 1318, 1320. In some embodiments, the lasers 1312, 1316 may include a III-V laser such as an InP laser or another suitable laser. The imaging array 1310, in some cases, may include a multispectral imaging sensor. In some examples, the CMOS circuitry 1306 may be coupled to the various health monitoring system 1300 components, thereby providing signal and data processing control for the health monitoring system 1300. In some embodiments, the waveguides 1314, 1318, 1320 may include passive silicon waveguides, lens waveguides, or other appropriate waveguides. In some embodiments, the exemplary health monitoring system 1300 may provide for imaging of biological cells and proteins, although other applications are possible. As shown, light generated by the laser 1312 may travel through the waveguide 1314 and exit via an output facet 1315, and light generated by the laser 1316 may travel through the waveguide 1318 and exit via an output facet 1319. The light exiting each of the waveguides 1314, 1318 may be incident upon a test subject 1322 (e.g., such as a biological cell). Due to the excitation on the test subject 1322 caused by the incident light, the test subject 1322 may generate a fluorescence signal that is captured by the waveguide 1320 (e.g., via an input facet 1321) which subsequently transmits the fluorescent light through an output facet 1323 of the waveguide 1320, being thereby incident on the imaging array 1310. In some embodiments, the disclosed convex profile (e.g., convex prism/ridge or convex lens/dome) may be formed at one or more of the output facet 1315 of the waveguide 1314, the output facet 1319 of the waveguide 1318, and the output facet 1323 of the waveguide 1320, although other embodiments are possible. Thus, for the light rays traveling through and exiting one or more of the waveguides 1314, 1318, 1320, optical loss is substantially mitigated, the output intensity is enhanced and on-target, and the optical performance of the one or more of the waveguides 1314, 1318, 1320 (and the health monitoring system 1300) is enhanced. Generally, the various components of the exemplary health monitoring system 1300 serve to guide light, extract optical signals, process the signals, and wirelessly transmit the signals. Moreover, with the incorporation of the disclosed convex profile, as discussed above, the health monitoring system 1300 may provide an improved imaging capability and enhanced reliability.

The various embodiments described herein offer several advantages over the existing art. It will be understood that not all advantages have been necessarily discussed herein, no particular advantage is required for all embodiments, and other embodiments may offer different advantages. For example, embodiments discussed herein include a photonic device and a method of forming the photonic device. In particular, some embodiments of the present disclosure provide a method of forming a silicon waveguide having a core with a convex profile to mitigate optical loss by output field shift. To be sure, the various embodiments disclosed herein are not limited to silicon and may also apply to other core materials (e.g., SiN, polymers, III-V materials, or others). In some embodiments, the convex profile includes a convex prism or a convex ridge profile having top and bottom surfaces of the waveguide core layer with slanting (e.g., tapered), but oppositely oriented, surfaces. In an example, the convex prism or convex ridge profile may be formed using a high-pressure etch of the bottom oxide cladding. Alternatively, in some embodiments, the convex prism or convex ridge profile may be formed using a two-step process including (i) formation of a re-entrant surface profile of the silicon core layer and (ii) tapering a top portion of the silicon core layer by way of a bottom oxide cladding etching process. In some embodiments, the convex profile instead includes a convex lens or dome profile having a substantially smooth, rounded surface. In some embodiments, the convex lens or dome profile may be formed by first forming the convex prism or convex ridge profile by using the high-pressure or the two-step process discussed above, followed by performing a ridge trimming process to round or smooth out the surface of the convex prism or convex ridge profile, thereby providing the convex lens or dome profile. Generally, embodiments of the present disclosure serve to improve (reduce) waveguide optical loss or malfunction that may be due to an output field shift. In addition, various embodiments provide for enhanced output intensity by matching an output field diameter with a detector. Further, the present embodiments are cost-effective in that undesirable tapered profiles can be mitigated and/or avoided without additional cost. Other embodiments and advantages will be evident to those skilled in the art upon reading the present disclosure.

Thus, one of the embodiments of the present disclosure described a method of fabricating a photonic device including forming a layer stack over a substrate. In some embodiments, the layer stack includes a lower cladding layer, a core layer disposed over the lower cladding layer, and an upper cladding layer disposed over the core layer. In some examples, the method further includes patterning the layer stack to form a waveguide for the photonic device. In some cases, the waveguide includes the core layer, and the core layer includes a lateral surface having a convex profile.

In another of the embodiments, discussed is a method that includes forming a passive waveguide heterostructure including a first cladding layer disposed over a substrate, a waveguide core layer disposed over the first cladding layer, and a second cladding layer disposed over the waveguide core layer. In some embodiments, the method further includes etching the second cladding layer to expose the waveguide core layer, etching the waveguide core layer to expose the first cladding layer, and etching the first cladding layer to expose the substrate. In some embodiments, etching the first cladding layer simultaneously etches the waveguide core layer to form a convex profile at an output facet of the waveguide core layer.

In yet another of the embodiments, discussed is a photonic device including a lower cladding layer disposed over a substrate. In some embodiments, the lower cladding layer includes a first oxide layer. In some examples, the photonic device further includes a waveguide core layer disposed over the lower cladding layer. In some cases, the waveguide core layer includes silicon (Si). In some embodiments, the photonic device further includes an upper cladding layer disposed over the waveguide core layer. In some examples, the upper cladding layer includes a second oxide layer. In various embodiments, a lateral surface of the waveguide core layer has a convex profile.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of fabricating a photonic device, comprising:
    forming a layer stack over a substrate, wherein the layer stack includes a lower cladding layer, a core layer disposed over the lower cladding layer, and an upper cladding layer disposed over the core layer; and
    patterning the layer stack to form a waveguide for the photonic device;
    wherein the waveguide includes the lower cladding layer, the core layer, and the upper cladding layer, wherein the core layer includes a lateral sidewall having a convex profile, and wherein the lower and upper cladding layers include respective lateral surfaces having different surface profiles; and
    wherein the patterning the layer stack comprises:
        etching the upper cladding layer;
        etching the core layer to expose the lateral sidewall and to form a re-entrant surface profile along the lateral sidewall; and
        etching the lower cladding layer, wherein the etching the lower cladding layer simultaneously etches a top portion of the core layer, while a bottom portion of the core layer retains the re-entrant surface profile.

2. The method of claim 1, wherein the patterning the layer stack further includes etching the lower cladding layer of the layer stack using a high-pressure etch.

3. The method of claim 1, wherein the convex profile includes a convex prism or a convex ridge profile having a top surface and a bottom surface with slanting, but oppositely oriented, surfaces.

4. The method of claim 3, further comprising performing a trimming process to smooth out the convex prism or the convex ridge profile.

5. The method of claim 4, wherein after the trimming process the convex profile includes a convex lens or dome profile having a substantially smooth, rounded surface.

6. The method of claim 4, wherein the trimming process is performed using a plasma etching tuning process or a chemical polishing process.

7. The method of claim 1, wherein the patterning the layer stack also at least partially etches the substrate.

8. The method of claim 1, wherein the lower cladding layer includes a substantially vertical lateral surface, and wherein the upper cladding layer includes a slanted lateral surface.

9. The method of claim 1, wherein the etching the lower cladding layer also reduces a thickness of the upper cladding layer.

10. A method, comprising:
    forming a waveguide heterostructure including a first cladding layer disposed over a substrate, a waveguide core layer disposed over the first cladding layer, and a second cladding layer disposed over the waveguide core layer;
    etching the second cladding layer to expose the waveguide core layer;
    etching the waveguide core layer to expose the first cladding layer; and
    etching the first cladding layer to expose the substrate;
    wherein the etching the first cladding layer simultaneously etches the waveguide core layer to form a convex profile at an output facet of the waveguide core layer;
    wherein the etching the waveguide core layer forms a re-entrant surface profile along the output facet of the waveguide core layer; and
    wherein the etching the first cladding layer simultaneously etches a top portion of the waveguide core layer, while a bottom portion of the waveguide core layer retains the re-entrant surface profile, to form the convex profile at the output facet of the waveguide core layer.

11. The method of claim 10, wherein the etching the first cladding layer is performed using a high-pressure etch.

12. The method of claim 11, wherein the high-pressure etch is performed at a pressure greater than or equal to about 40 MPa.

13. The method of claim 10, further comprising performing a trimming process to smooth out the convex profile at the output facet of the waveguide core layer.

14. A photonic device, comprising:
    a lower cladding layer disposed over a substrate, wherein the lower cladding layer includes a first oxide layer;
    a waveguide core layer disposed over the lower cladding layer, wherein the waveguide core layer includes silicon (Si); and
    an upper cladding layer disposed over the waveguide core layer, wherein the upper cladding layer includes a second oxide layer;
    wherein a lateral surface of the waveguide core layer has a convex profile, wherein the lateral surface of the waveguide core layer includes slanted, oppositely oriented, top and bottom surfaces, wherein the top surface is slanted at a first angle measured between the upper cladding layer and the top surface, and wherein the bottom surface is slanted at a second angle measured between the lower cladding layer and the bottom surface; and
    wherein the upper cladding layer includes a slanted lateral surface having a same orientation as the top surface of the lateral surface of the waveguide core layer, and wherein the slanted lateral surface of the upper cladding layer includes a planar surface.

15. The photonic device of claim 14, wherein the slanted top and bottom surfaces include a convex prism or a convex ridge profile.

16. The photonic device of claim 14, wherein the lateral surface of the waveguide core layer includes a convex lens or dome profile having a substantially smooth, rounded surface that extends across an entirety of the lateral surface of the waveguide core layer.

17. The photonic device of claim 14, wherein the waveguide core layer has a first thickness, wherein the waveguide core layer includes an upper portion and a lower portion that are defined as portions of the waveguide core layer on opposing sides of a plane that is level with an apex of the convex profile, and wherein a second thickness of the upper portion is greater than or equal to one-sixth of the first thickness.

18. The photonic device of claim 14, wherein the first angle and the second angle are substantially the same.

19. The photonic device of claim 14, wherein the upper cladding layer tapers in a direction away from the waveguide core layer.

20. The photonic device of claim 14, wherein the lateral surface of the waveguide core layer includes a rounded off ridge at an apex of the convex profile of the lateral surface.

\* \* \* \* \*